US008184091B2

(12) United States Patent
Uchida

(10) Patent No.: US 8,184,091 B2
(45) Date of Patent: May 22, 2012

(54) DRIVING METHOD OF ELECTROPHORETIC DISPLAY DEVICE, ELECTROPHORETIC DISPLAY DEVICE, AND ELECTRONIC APPARATUS

(75) Inventor: Masami Uchida, Chino (JP)

(73) Assignee: Seiko Epson Corporation, Tokyo (JP)

( * ) Notice: Subject to any disclaimer, the term of this patent is extended or adjusted under 35 U.S.C. 154(b) by 667 days.

(21) Appl. No.: 12/366,495

(22) Filed: Feb. 5, 2009

(65) Prior Publication Data

US 2009/0231267 A1 Sep. 17, 2009

(30) Foreign Application Priority Data

Mar. 14, 2008 (JP) ................................ 2008-066226

(51) Int. Cl.
*G09G 3/34* (2006.01)
*G02B 26/00* (2006.01)

(52) U.S. Cl. ......................... 345/107; 345/214; 359/296

(58) Field of Classification Search .................. 345/104, 345/107, 175, 87, 89, 214, 108, 76, 690; 359/296, 290, 291
See application file for complete search history.

(56) References Cited

U.S. PATENT DOCUMENTS 5,841,180 A * 11/1998 Kobayashi et al. ........... 257/448
6,476,867 B1 * 11/2002 Kobayashi et al. ........... 348/307
6,842,165 B2 * 1/2005 Inoue ............................ 345/107
6,987,503 B2 * 1/2006 Inoue ............................ 345/107
7,760,419 B2 * 7/2010 Lee ............................... 359/296
7,961,171 B2 * 6/2011 Miyasaka et al. ............. 345/104

FOREIGN PATENT DOCUMENTS

JP 2003-84314 A 3/2003

* cited by examiner

*Primary Examiner* — Nabil Hindi
(74) *Attorney, Agent, or Firm* — AdvantEdge Law Group, LLC

(57) ABSTRACT

A driving method of an electrophoretic display device, including a pair of substrates with an electrophoretic element which is interposed between the substrates and contains electrophoretic particles, a plurality of pixel electrodes formed at an electrophoretic element side of either one substrate of the pair of substrates, and a common electrode which opposes to the plurality of pixel electrodes and is formed at an electrophoretic element side of the other substrate, includes an image display step of inputting potentials, which are determined according to image data, to the plurality of pixel electrodes and a predetermined potential to the common electrode and displaying an image according to the image data by driving the electrophoretic element, and an image maintaining step of causing the plurality of pixel electrodes and the common electrode to have the same potential after the image display step.

9 Claims, 17 Drawing Sheets

DRIVING METHOD OF ELECTROPHORETIC DISPLAY DEVICE, ELECTROPHORETIC DISPLAY DEVICE, AND ELECTRONIC APPARATUS

BACKGROUND

1. Technical Field

The present invention relates to a driving method of an electrophoretic display device, an electrophoretic display device, and an electronic apparatus.

2. Related Art

JP-A-2003-84314 discloses an electrophoretic display device in which a plurality of microcapsules is interposed between a pair of substrates. In this kind of electrophoretic display device, a first substrate on which pixel electrodes are formed is adhered to a second substrate provided with an electrophoretic element in which the plurality of microcapsules is formed so that the electrophoretic element is interposed between the first and second substrates.

However, the above-mentioned microcapsule-type electrophoretic display device has a problem in that “color fade-out” or “display blur” occurs after displaying an image. In particular, the color fade-out at the border between white and black outstandingly appears. Hereinafter, a phenomenon causing the color fade-out will be described with reference to FIGS. 21A to 21C.

FIG. 21A shows a microcapsule-type electrophoretic display device and FIGS. 21B and 21C show two adjacent pixels of the electrophoretic display device of FIG. 21A in an enlarged view.

The electrophoretic display device shown in FIG. 21A includes a first substrate 30, a second substrate 31, and an electrophoretic element 32 in which a plurality of microcapsules 20 is arranged and which is interposed between the first substrate 30 and the second substrate 31. A plurality of pixel electrodes 35 is arranged on the electrophoretic element 32 side of the first substrate 30. On the other hand, a common electrode 37 which opposes to the plurality of pixel electrodes 35 is formed on one surface of the second substrate 31, and the electrophoretic element 32 composed of the plurality of microcapsules 20 is provided on the common electrode 37. The electrophoretic element 32 and the first substrate 30 are adhered to each other via an adhesive layer 33.

Details about each of members of the electrophoretic display device will be described with reference to FIG. 2 in the following description.

FIG. 21B shows a state of the electrophoretic display state after an image is displayed by applying a predetermined voltage between the pixel electrodes 35 and the common electrode 37 in the electrophoretic display device having the above-mentioned structure. In FIG. 21B, a pixel electrodes 35*a* is applied with a negative voltage, for example −10V, and a pixel electrode 35*b* is applied with a positive voltage (for example, 10V). The common electrode 37 has a ground potential 0V. In a microcapsule 20*a* provided on the pixel electrode 35*a,* black particles 26 charged positive are drawn to the pixel electrode 35*a* side and white particles 27 charged negative are drawn to the common electrode 37 (a white display). In a microcapsule 20*b* provided on the pixel electrode 35*b,* white particles 27 charged negative are drawn to the pixel electrode 35*b* side and black particles 26 charged positive are drawn to the common electrode 37 (a black display).

In the electrophoretic display device, after the image display operation shown in FIG. 21B, a display is maintained by the memory characteristic of the electrophoretic element 32. Accordingly, as shown in FIG. 21C, each of the pixel electrodes falls into a high impedance state (an electrically disconnected state).

However, although each of the pixel electrodes is in the high impedance state, it is difficult to continuously and perfectly maintain the display. That the color fade-out occurs as time passes.

It is assumed that the followings comprehensively affect the color fade-out phenomenon.

First of all, the adhesive layer 33 and the shell (wall film) of the microcapsule 20 which fix the microcapsules 20 to the surface of the pixel electrodes 35*a* and 35*b* become leakage paths and therefore leakage current between the pixel electrodes easily occurs. Further, this is because the adhesive layer and the wall films must not have high resistance because it is needed to effectively apply a voltage to the microcapsule 20.

In particular, a gap between the pixel electrodes 35*a* and 35*b* has a small value of about several μms to several tens of μms so as to respond to a high definition display. Accordingly, after each of the pixel electrodes falls into the high impedance state, charges applied to the pixel electrodes 35*a* and 35*b* beforehand may come to move between the pixel electrodes 35 via the adhesive layer 33 or the wall films of the microcapsules 20. In the case of having a structure in which a switching element, such as a selection transistor, is provided for each of the pixels, off current (off leak) of the transistor becomes one of the leak paths.

Owing to the migration of the above-mentioned charges, all of the pixel electrodes 35 become the same potential (convergence potential Vc). For example, as shown in FIG. 21C, a positive convergence voltage +Vc is applied to the pixel electrodes 35*a* and 35*b.* With this operation, electric field which is opposite to electric field generated in an image writing period is applied to the microcapsule 20*a* disposed on the pixel electrode 35*a* by which the white display is performed. As a result, as shown in the figure, some of the black particle 26 and some of the white particles 27 electrophoretically migrate and therefore a display state changes (color fad-out occurs). Further, when the pixel electrodes 35*a* and 35*b* have a negative convergence potential, such color fade-out occurs in the black display pixel.

In the known electrophoretic display device, the image display state changes after the image display due to the above operation and therefore the color fade-out occurs.

SUMMARY

An advantage of some aspect of the invention is to provide a driving method of an electrophoretic display device which can effectively suppress occurrence of color fade-out (display blur) after an image display operation and can perform a high quality display.

Another advantage of some aspects of the invention is to provide an electrophoretic display device in which color fade-out after an image display operation is suppressed and by which a high quality display can be obtained.

According to one aspect of the invention, there is provided a driving method of an electrophoretic display device including a pair of substrates with an electrophoretic element interposed therebetween, a plurality of pixel electrodes formed at an electrophoretic element side of either one substrate of the pair of substrates, and a common electrode which opposes to the plurality of pixel electrodes and is formed at an electrophoretic element side of the other substrate, wherein the driving method includes an image display step of inputting a potential according to image data to the plurality of pixel electrodes and a predetermined potential to the common electrode and displaying an image according to the image data by driving the electrophoretic element, and an image maintaining step of causing the plurality of pixel electrodes and the common electrode to be at an identical potential after displaying the image.

According to the driving method, since the plurality of pixel electrodes and the common electrode are set to the same potential after the image display, it is possible to eliminate the potential difference between the electrodes surrounding the electrophoretic element and therefore it is possible to prevent the display state of the electrophoretic element from changing. Accordingly, it is possible to prevent color fade-out from occurring and to perform a high quality display.

In the driving method, it is preferable that in the image display step, a positive potential or a negative potential be input to the pixel electrodes and a midway potential between the positive potential and the negative potential is input to the common electrode, and in the image maintaining step, the midway potential is input to the plurality of pixel electrodes and the common electrode.

According to the driving method, since the plurality of pixel electrodes and the common electrode are maintained at the midway potential and are set to the same potential in the image maintaining step, the electric field exerted to the electrophoretic element is not formed and therefore it is possible to prevent the display state from changing. Accordingly, it is possible to prevent color fade-out from occurring and to perform a high quality display.

In the driving method, it is preferable that in the image display step, the pixel electrodes be applied with a first potential and a second potential which are a positive potential or a ground potential, and the common electrode be applied with a signal in which the first potential and the second potential alternate each other, and in the image maintaining step, the pixel potentials and the common potential are applied with a potential between the first potential and the second potential.

According to the driving method, since the plurality of image elements and the common electrode are maintained at the same potential in the image maintaining step, it is possible to prevent the changing of the display state of the electrophoretic element from occurring.

In the driving method, it is preferable that, after the image display, the plurality of pixel electrodes fall to the high impedance state and the common electrode be applied with a convergence potential determined according to distribution of potentials of the pixel electrodes.

When the pixel electrodes are in the high impedance state after displaying the image, charges applied to the pixel electrodes migrate among the pixel electrodes and therefore the charges are distributed uniformly among the plurality of pixel electrodes. As a result, the potential of the plurality of pixel electrodes converges a certain potential, and this potential is called a convergence potential.

When observing the potential change of each of the pixel electrodes with acceptance on the premise that the above phenomenon occurs, after a period of the high impedance state passes, the potential changes from an input potential in an image display period and comes to approach the convergence potential. In this procedure, when a potential state of the pixels of the image display period is reversed, i.e. when a high and low relationship between a potential of the pixel electrodes and a potential of the common electrodes is reversed, electrophoretic particles migrate in an opposite direction to the direction in the image display period and therefore color fade-out may occur. Conversely, according to this embodiment, since the convergence potential is input to the common electrode, even if the potential of the pixel electrodes changes to approach to the convergence potential, the high and low potential relationship between the pixel electrodes and the common electrode is maintained and therefore the pixel electrode and the common electrode become the same potential at last. Accordingly, according to the driving method, it is possible to avoid color fade-out and to perform a high quality display.

In the driving method, it is preferable that the image maintaining step be performed before the high and low relationship of the potential of the pixel electrodes and the potential of the common electrode in the high impedance state become reversed to each other.

Since the potential of the pixel electrodes begins to change right after the pixel electrodes fall to the high impedance state, if the convergence potential is not input to the common electrode at this time, the high and low relationship between the potentials of the pixel electrode and the common electrode is likely to be reversed according to the potential of the common electrode. Accordingly, it is preferable that the timing of inputting the convergence voltage to the common electrode comes before the high and low relationship is reversed. With this operation, it is possible to effectively suppress the color fade-out.

In the driving method, it is preferable that, a step of acquiring the convergence potential on the basis of gradation distribution of the image data be performed before the image maintaining step. That is, it is preferable that the convergence potential be computed on the basis of the image data used in the image display step, and the convergence potential be input to the common electrode.

According to another aspect of the invention, there is provided an electrophoretic display device including a pair of substrates with an electrophoretic element interposed therebetween, a plurality of pixel electrodes formed at an electrophoretic element side of either one of the pair of substrates, and a common electrode which opposes to the plurality of pixel electrodes and is formed at an electrophoretic element side of the other substrate, in which the electrophoretic display device has an image display period in which the plurality of pixel electrodes is applied with a potential according to image data, the common electrode is applied with a predetermined potential, and the electrophoretic element is driven to display an image on the basis of the image data, and an image maintaining period in which the plurality of pixel electrodes and the common electrode are maintained at an identical potential after the image display.

With this structure, since the electrophoretic display device has the period in which the pixel electrodes and the common electrode are maintained at the identical potential after the image display, it is possible to prevent an electric field from acting to the electrophoretic element after the image display. With this structure, it is possible to avoid color fade-out and to obtain a high quality display.

In the electrophoretic display device, it is preferable that, after the image display, the common electrode be applied with a convergence potential determined according to potential distribution of the pixel electrodes after the plurality of pixel electrode comes to fall to the high impedance state.

With this structure, although the pixel electrodes and the common electrode are not at the identical potential right after the image display, when the potential of the pixel electrodes changes with a time, it is possible to make the pixel electrodes and the common electrode almost the identical potential while maintaining a high an low relationship between the potential of the pixel electrodes and the potential of the common electrode. Accordingly, there is no chance that the direction of the electric field acting with respect to the electrophoretic element after the image display is reversed. With this method, it is possible to prevent color fade-out from occurring and to obtain a high quality display.

In the electrophoretic display device, it is preferable that the electrophoretic display device have a convergence potential computing portion which computes the convergence potential on the basis of the image data.

According to this structure, it is possible to obtain the convergence potential which must be rapidly input to the common electrode.

In the electrophoretic display device, it is preferable that the convergence potential computing portion have a look-up table in which gradation distribution of the image data and the convergence potentials correspond to each other.

With this structure, it is possible to obtain the convergence potential which must be easily and rapidly input to the common electrode using a simple circuit.

According to a further aspect of the invention, there is provided an electronic apparatus including the above-mentioned electrophoretic display device.

With this structure, it is possible to provide an electronic apparatus provided with a high quality display unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
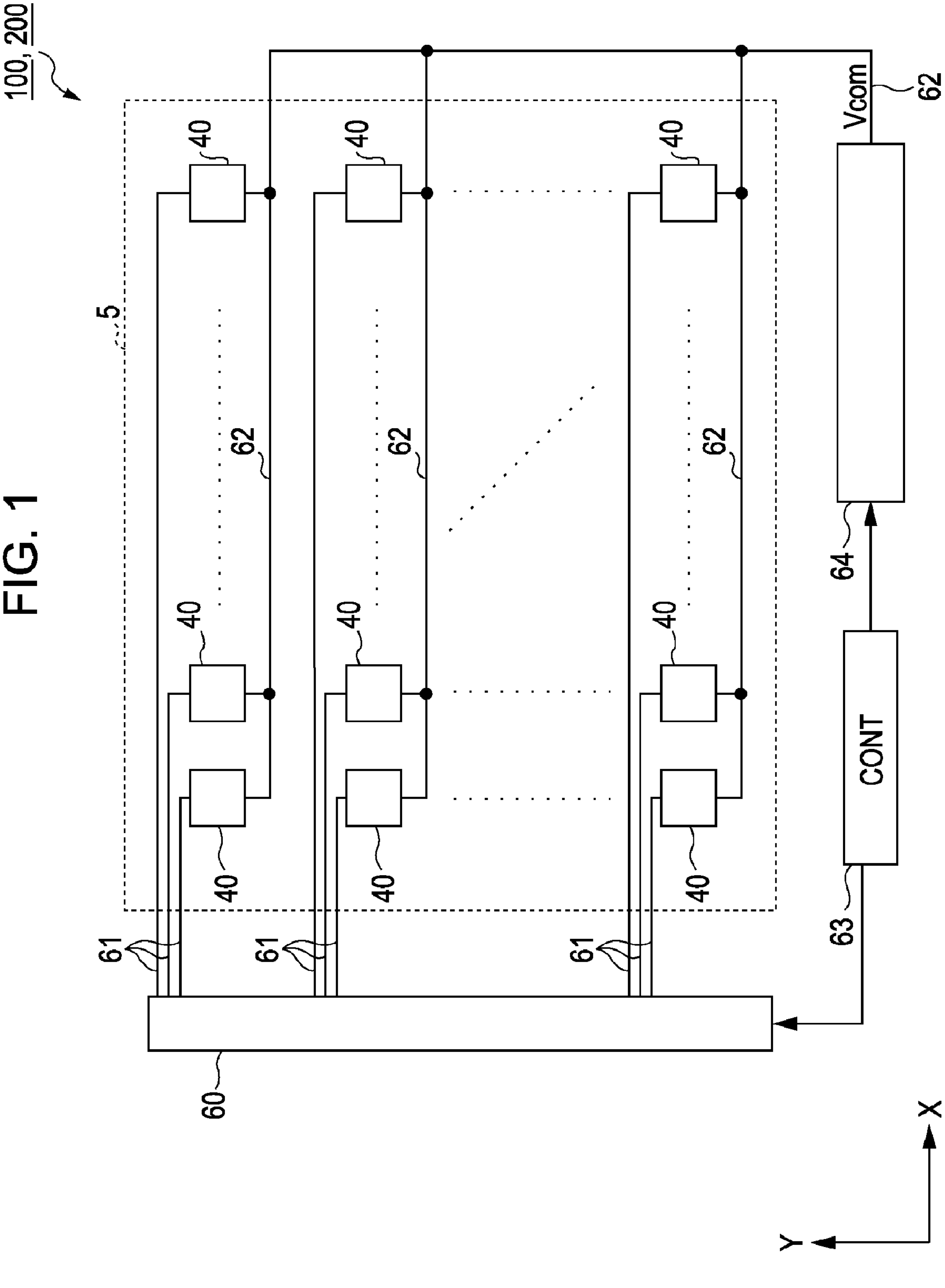
FIG. 1 is a schematic view illustrating an electrophoretic display device according to a first embodiment of the invention.

Hereinafter, an electrophoretic display device and a driving method thereof according to embodiments of the invention will be described with reference to the accompanying drawings.

The embodiments show some aspects of the invention and do not limit the scope of the invention. The embodiments can be arbitrarily altered within the scope of the technical spirit of the invention. In the drawings, structures and scales may be different from real ones in order to help people better under stand each member of the invention.

FIG. 1 shows an electrophoretic display device 100 according to a first embodiment of the invention.

The electrophoretic display device 100 includes a display portion 5 in which a plurality of pixels (segments) 40 is placed, a pixel electrode drive circuit 60, a common electrode drive circuit 64, and a controller (control portion) 63. The pixel electrode drive circuit 60 is connected between each of the pixels 40 via each of pixel electrode wirings 61 and the common electrode drive circuit 64 is connected to each of the pixels 40 via each of common electrode wirings 62. The controller 63 is connected to the pixel electrode drive circuit 60 and the common electrode drive circuit 64 and comprehensively controls these drive circuits.

The electrophoretic display device 100 is a segment drive type electrophoretic display device. That is, image data is sent to the pixel electrode drive circuit 60 from the controller 63, and potentials which are based on the image data are directly input to the pixels 40.

Figure 2:
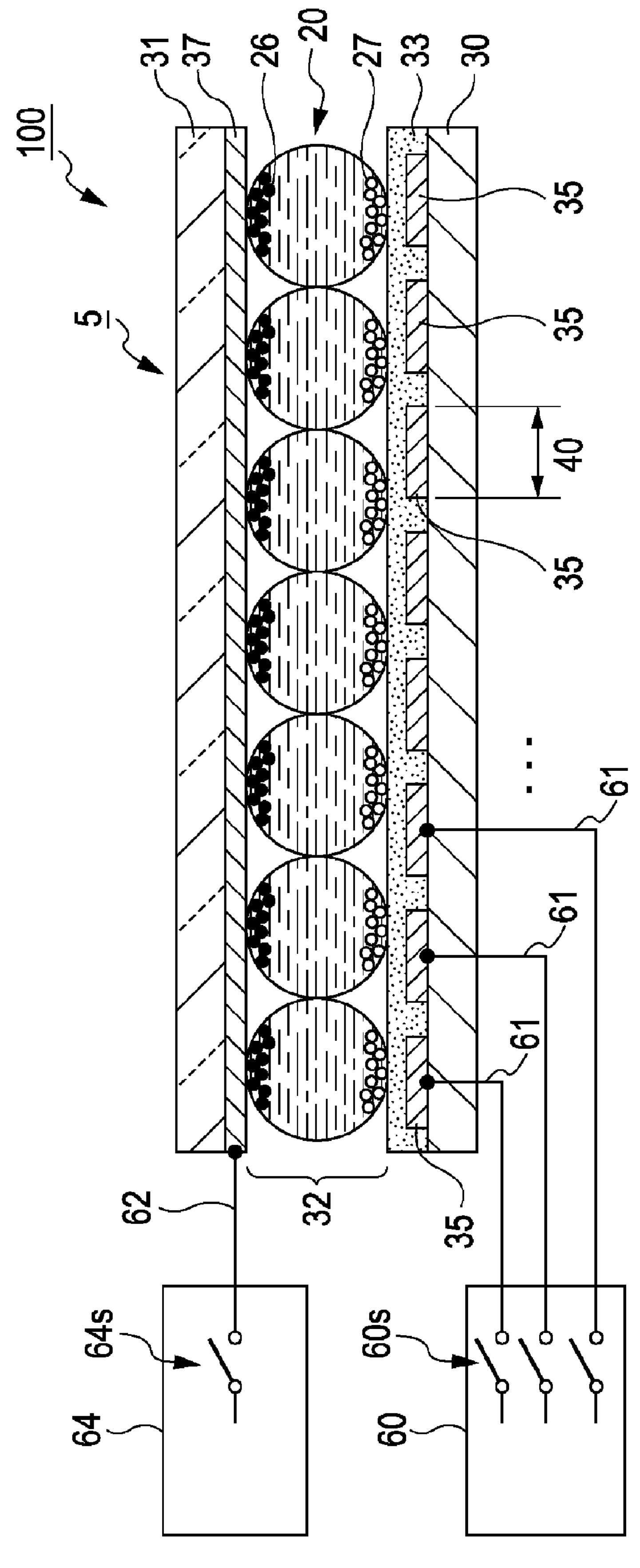
FIG. 2 is a sectional view illustrating the electrophoretic display device according to the first embodiment.

FIG. 2 shows a sectional structure and an electrical configuration of the electrophoretic display device 100.

As shown in FIG. 2, the display portion 5 of the electrophoretic display device 100 has a structure in which an electrophoretic element 32 is interposed between a first substrate 30 and a second substrate 31. A plurality of pixel electrodes (segment electrodes) 35 is formed on one surface of the first substrate 30 which faces at the electrophoretic element 32, and a common electrode 37 is formed on one surface of the second substrate 31 which faces the electrophoretic element 32. The electrophoretic element 32 has a structure in which a plurality of microcapsules 20, each containing electrophoretic particles therein, is arranged in a plane. The electrophoretic display device 100 according to this embodiment displays an image formed by the electrophoretic element 32 at the common electrode 37 side.

The first substrate 30 is a substrate made of plastic or glass and may not be a transparent substrate since it is placed on the opposite side of the displaying surface of the image. The pixel electrode 35 may be a multi-layered structure in which a nickel plating layer and a gold plating layer are laminated on copper (Cu) clad in this order, or may be formed of aluminum (Al) or indium tin oxide (ITO). A voltage is applied to the electrophoretic element 32 via the pixel electrodes 35.

On the other hand, the second substrate 31 is a substrate made of glass or plastic and may be a transparent substrate since it is placed on the displaying surface side of the image. The common electrode 37 is an electrode for applying a voltage to the electrophoretic element 32 along with the pixel electrodes 35, and is a transparent electrode made of magnesium silver (MgAg), indium tin oxide (ITO), or indium zinc oxide (IZO).

Each of the pixel electrodes 35 is connected to the pixel electrode drive circuit 60 via the pixel electrode wiring 61. The pixel electrode drive circuit 60 is provided with a switching element 60*s* corresponding to each of the pixel electrode wirings 61. The common electrode 37 is connected to the common electrode drive circuit 64 via a common electrode wiring 62. The common electrode drive circuit 64 is provided with a switching element 64*s*.

The electrophoretic display element 32 is generally treated as an electrophoretic sheet which is formed on the second substrate 31 side beforehand and includes an adhesive layer 33. In the manufacturing process, the electrophoretic sheet is handled in a state in which a release sheet for protecting the surface of the adhesive layer 33 is attached thereto. As the electrophoretic sheet from which the release sheet is peeled off is attached to the first substrate 30 which is separately manufactured and on which the pixel electrodes 35 and the like are formed, the display portion 5 is formed. Accordingly, the adhesive layer 33 comes to be present only on the pixel electrode 35 side.

Figure 3:
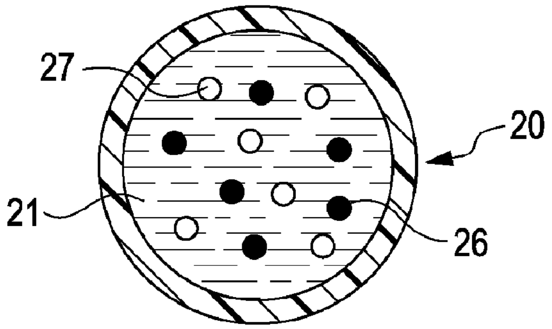
FIG. 3 is a schematic view illustrating a microcapsule.

FIG. 3 schematically shows a sectional structure of a microcapsule 20. The microcapsule 20 has a grain size of about 30 to 50 μm and is a spherical body contains a dispersion medium 21, a plurality of white particles (electrophoretic particles) 27, and a plurality of black particles (electrophoretic particles) 26 therein. As shown in FIG. 2, the microcapsule 20 is interposed between the common electrode 37 and the pixel electrodes 35. A single pixel 40 includes a single microcapsule 20 or a plurality of microcapsules 20.

The shell (wall film) of the microcapsule 20 is made of an acryl resin, such as polymethylmethacrylate and polyethylmethacrylate, or a transparent polymer resin, such as urea resin and Arabic gum. The dispersion medium 21 is a liquid which disperses the white particles 27 and the black particles 26 in the microcapsule 20. The dispersion medium 21 may be water, alcohol-based solvents (methanol, ethanol, isopropanol, butanol, octanol, and methyl cellosolve), a variety of esters (acetic ethyl and acetic butyl), ketones (acetone, methylethylketone, and methylisobutylketones), aliphatic hydrocarbons (pentane, hexane, and octane), cycloaliphatic hydrocarbons (cyclohexane and methylcyclohexane), aromatic hydrocarbons (benzene, toluene, benzene derivatives having a long-chain alkyl group (xylene, hexylbenzene, hebuthylbenzene, octylbenzene, nonylbenzene, decylbenzene, undecylbenzene, dodecylbenzene, tridecylebenzene, and tetradecylbenzene), halogenated hydrocarbon (methylene chloride, chloroform, carbon tetrachloride, and 1,2-dichloroethane), carboxylate, and other kinds of oils. These materials can be used in the form of a single material or a mixture. Further, surfactant may be added to the above.

The white particles 27 are particles (polymer or colloid) composed of white pigments, such as titanium dioxide, zinc oxide, and antimony trioxide, and are charged negative. The black particles 26 are particles (polymer or colloid) composed of black pigments, such as aniline black and carbon black, and are charged positive.

If it is necessary, a charge control agent composed of electrolyte, surfactant agent, metallic soap, resin, rubber, oil, varnish, and particles such as compounds; a dispersant agent, such as a titanium-based coupling agent, an aluminum-based coupling agent, a silane-based coupling agent; a lubricant; and a stabilizer can be added to these pigments.

Instead of the black particles 26 and the white particles 27, green, red, and blue pigments may be used. With such a structure, it is possible to display red, green, and blue colors on the display portion 5.

Figure 4A:
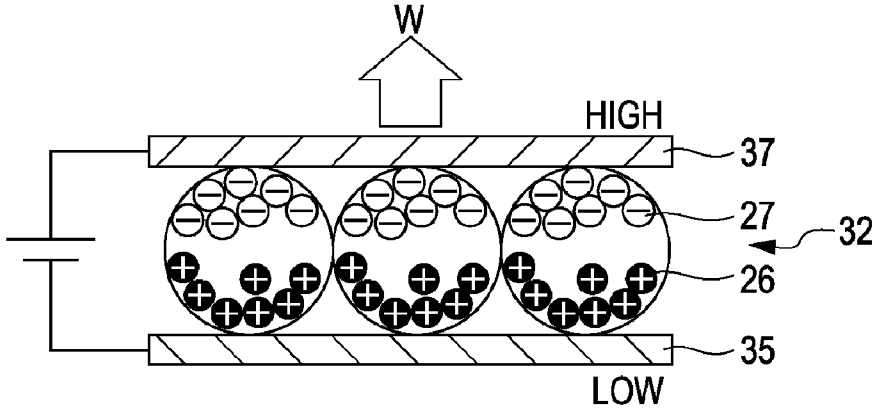
FIGS. 4A and 4B are explanatory views for explaining operations of the electrophoretic display device.
Figure 4B:
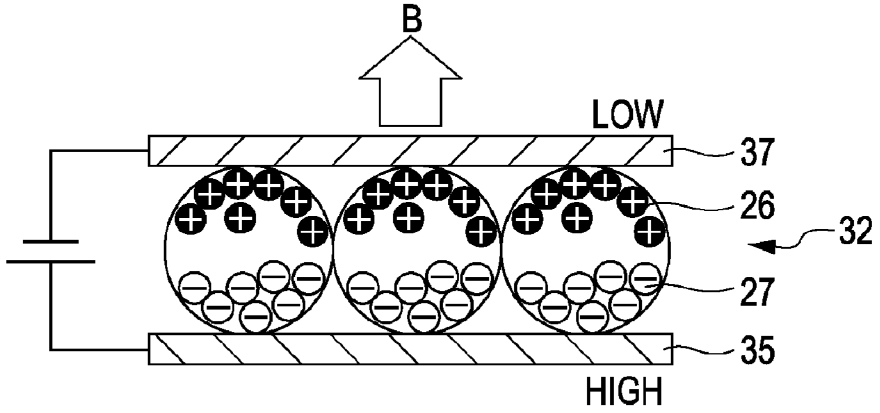

FIGS. 4A and 4B are explanatory views for explaining operation of the electrophoretic element. FIG. 4A shows a white display state of the pixel 40 and FIG. 4B shows a black display state of the pixel 40.

In the electrophoretic display device 100, potentials corresponding to image data are input to the pixel electrodes 35 of the pixels 40 from the pixel electrode drive circuit 60 via the pixel electrode wirings 61. On the other hand, a common electrode potential Vcom is input to the common electrode 37 from the common electrode drive circuit 64 via the common electrode wiring 62. With this operation, as shown in FIGS. 4A and 4B, the pixels 40 displays black and white in response to the potential difference between the pixel electrodes 35 and the common electrode 37.

In the case of the white display shown in FIG. 4A, the common electrode 37 is maintained at a relatively high potential and the pixel electrodes 35 are maintained at a relatively low potential. With this operation, the white particles 27 charged negative are drawn to the common electrode 37 and the black particles 26 charged positive are drawn to the pixel electrodes 35. As a result, when the pixel is viewed from the common electrode 37 side which is the displaying surface side, white W can be seen.

In the case of the black display shown in FIG. 4B, the common electrode 37 is maintained at a relatively low potential and the pixel electrodes 35 are maintained at a relatively high potential. So the black particles 26 charged positive are drawn to the common electrode 37 and the white particles 27 charged negative are drawn to the pixel electrodes 35. As a result, when the pixel is viewed from the common electrode 37 side, black B can be seen.

First Driving Method

Figure 5:
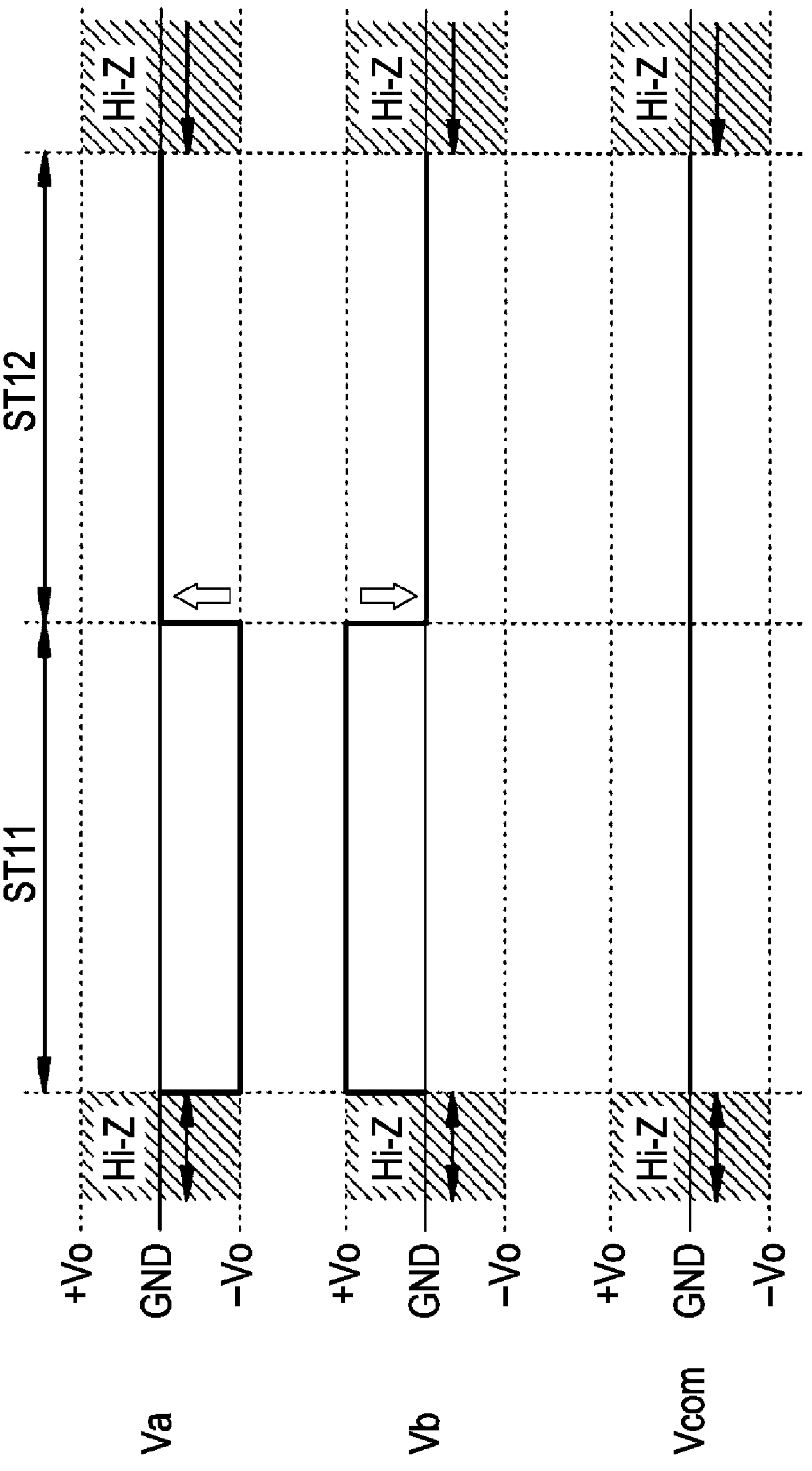
FIG. 5 is a timing chart according to a first driving method.
Figure 6A:
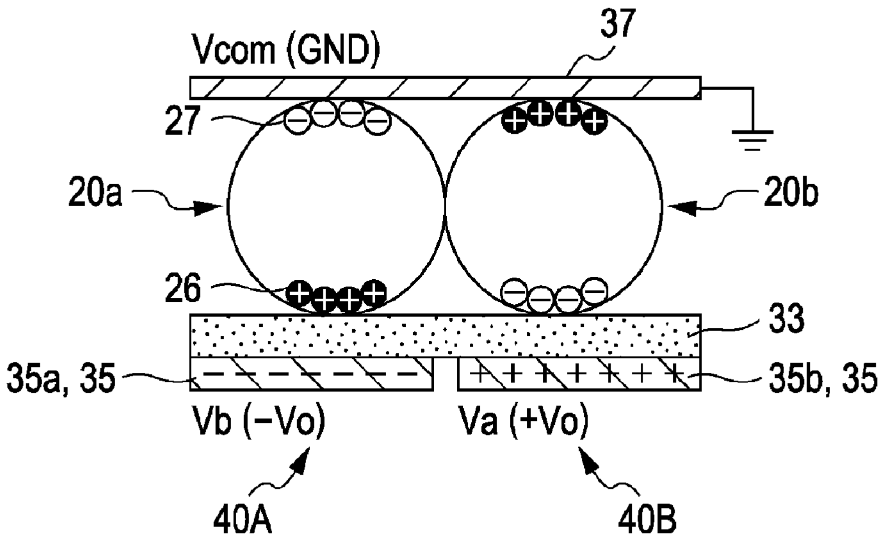
FIGS. 6A and 6B are enlarged views illustrating pixels and for explaining the first driving method.
Figure 6B:
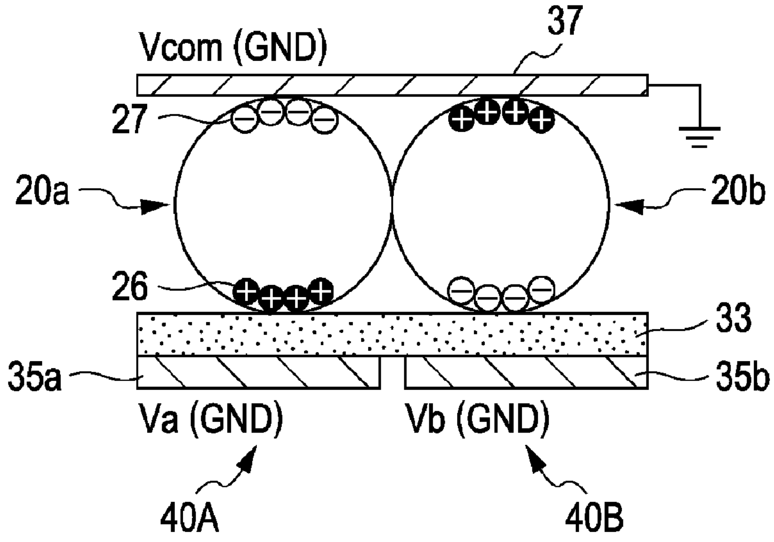

Next, a first driving method of the electrophoretic display device 100 will be described with reference to FIG. 5 and FIGS. 6A and 6B. FIG. 5 shows a timing chart for explaining the first driving method of the electrophoretic display device 100. FIGS. 6A and 6B schematically show two pixels 40 which are objects of explanation in the following description.

Two pixels 40A and 40B shown in FIGS. 6A and 6B are neighboring pixels in the display portion 5. The pixel 40A has a structure in which a microcapsule 20*a* is interposed between a pixel electrode 35*a* and a common electrode 37. The pixel 40B has a structure in which a microcapsule 20*b* is interposed between a pixel electrode 35*b* and the common electrode 37. An adhesive layer 33 is provided between the pixel electrodes 35*a* and 35*b* and the microcapsules 20*a* and 20*b*.

As shown in FIG. 5, the first driving method includes an image display step ST11 and an image maintaining step ST12. In FIG. 5, Va is a potential of the pixel electrodes 35*a*, Vb is a potential of the pixel electrode 35*b*, and Vcom is a potential of the common electrode 37.

In the image display step ST11, the image data is input to the pixel electrode drive circuit 60 from the controller 63, and potentials based on the image data are input to each of the pixels 40 of the display portion 5 from the pixel electrode drive circuit 60.

As shown in FIG. 6A, in the pixels 40A and 40B, a negative potential −Vo (Vo>0) is input to the pixel electrode 35*a*, and a positive potential +Vo is input to the pixel electrode 35*b*. A ground potential GND (0V) is input to the common electrode 37 from the common electrode drive circuit 64 via the common electrode wiring 62.

By such an operation, as shown in FIG. 6A, in the pixel 40A, the black particles 26 charged positive are drawn to the pixel electrode 35*a* maintained at a relatively low potential, and the white particles 27 charged negative are drawn to the common electrode 37 maintained at a relatively high potential. With such an operation, white is displayed by the pixel 40A. On the other hand, in the pixel 40B, the white particles 27 are drawn to the pixel electrode 35*b* and the black particles 26 are drawn to the common electrode 37. With such an operation, black is displayed by the pixel 40B. In such a manner, the display portion 5 displays an image based on the image data.

Next, the driving method progresses to the image maintaining step ST12. In the image maintaining step ST12, the ground potential is input to the pixel electrodes 35 of the pixels 40 from the pixel electrode drive circuit 60.

With this operation, as shown in FIG. 5 and FIG. 6B, the pixel electrodes 35*a* and 35*b* and the common electrode 37 fall to the ground potential, and the potential difference between the electrodes surrounding the microcapsules 20*a* and 20*b* becomes zero. Accordingly, migration of charges via the adhesive layer 33 and the microcapsules 20*a* and 20*b* is not likely to occur and color fade-out does not occur. Accordingly, it is possible to maintain good display state determined in the image display step ST11.

In the first driving method, as shown in FIG. 5, a power supply-off step which causes the pixel electrodes 35*a* and 35*b* and the common electrode 37 to fall into a high impedance state may be performed after the image maintaining step ST12. In this manner, since potential input to the electrodes is stopped, it is possible to suppress power consumption by the electrophoretic display device 100.

According to this driving method, the potential difference between the pixel electrodes 35*a* and 35*b* becomes zero in the image maintaining step ST12. For such a reason, even if each of the electrodes falls to the high impedance after the image maintaining step ST12, migration of the charges along the wall film of the microcapsule 20 and the adhesive layer 33 does not occur and therefore it is possible to maintain the good display state without consuming power.

In the above description, in the image maintaining step ST12, although the pixel electrodes 35*a* and 35*b* are applied with the ground potential, the maintained potential in the image maintaining step ST12 is not limited to the ground potential. That is, a certain potential may be selected to as the potential to be maintained in the image maintaining step ST12. For example, the pixel electrodes 35*a* and 35*b* and the common electrode 37 may be maintained at a high potential +Vo or a low potential −Vo. Such a driving method also has the similar advantages.

Second Driving Method

Next, a second driving method of the electrophoretic display device 100 will be described with reference to FIG. 7 and FIGS. 8A and 8B.

Figure 7:
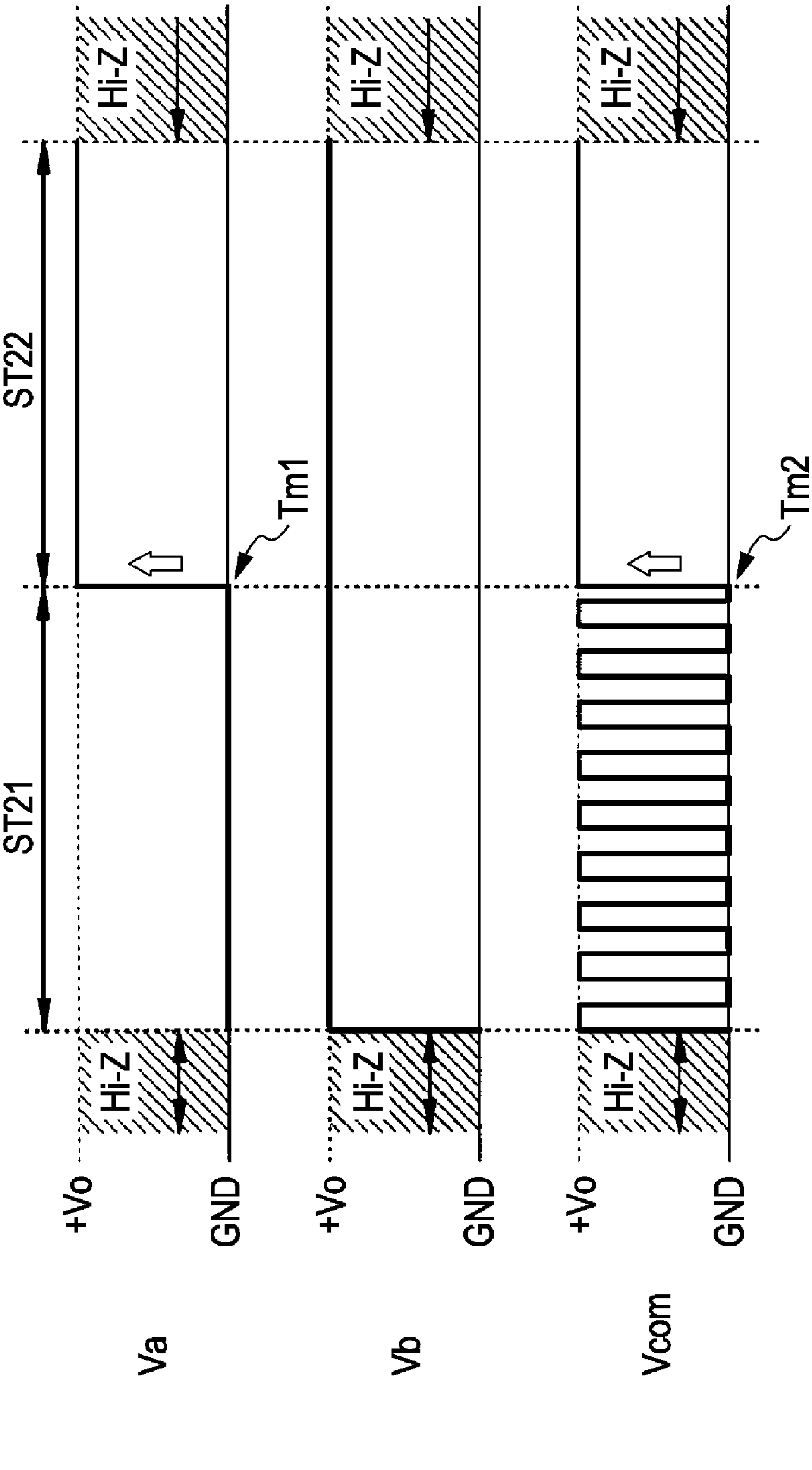
FIG. 7 is a timing chart according to a second embodiment.

FIG. 7 shows a timing chart relating to the second driving method of the electrophoretic display device 100. FIGS. 8A and 8B schematically show two pixels 40 which are objects of the following explanation. FIGS. 8A and 8B are views corresponding to FIGS. 6A and 6B which relate to the first driving method. The structure of the pixels 40A and 40B in FIG. 8 is the same as that of the pixels shown in FIGS. 6A and 6B.

As shown in FIG. 7, the second driving method includes an image display step ST21 and an image maintaining step ST22. In FIG. 7, Va is a potential of the pixel electrode 35*a,* Vb is a potential of the pixel electrode 35*b,* and Vcom is a potential of the common electrode 37.

In the image display step ST21, image data is input to the pixel electrode drive circuit 60 from the controller 63, and potentials according to the image data are input to the pixel electrodes 35 of the display portion 5 from the pixel electrode drive circuit 60. Further, a predetermined signal is input to the common electrode 37 from the common electrode drive circuit 64.

Figure 8A:
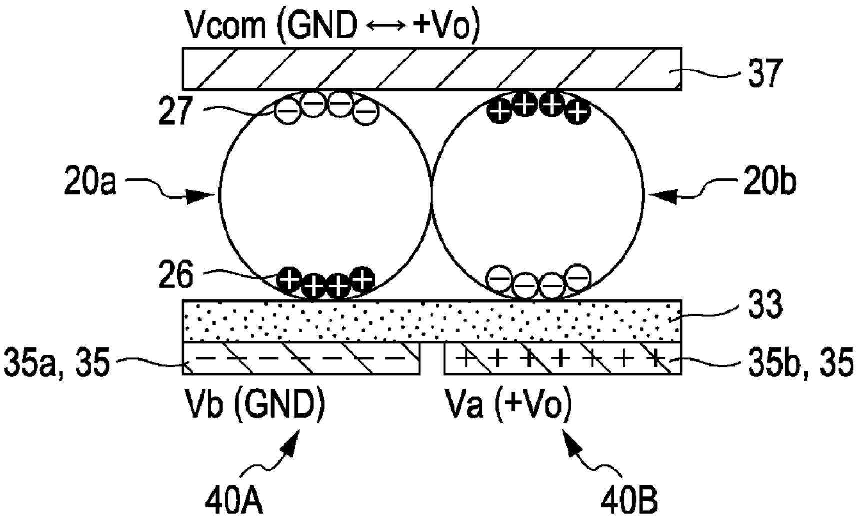
FIGS. 8A and 8B are enlarged views illustrating pixels and for explaining the second driving method.

In the pixels 40A and 40B of FIG. 8A, a ground potential GND (0V) which is a low potential is input to the pixel electrode 35*a,* the high potential +Vo is input to the pixel electrode 35*b.* The common electrode 37 is applied with a rectangular-shaped pulse signal in which the low potential GND and the high potential +Vo are periodically repeated.

In this embodiment, such a driving method is called "common swing driving." The common swing driving method means a driving method in which at least a single period of the pulse in which the high potential H and the low potential L are repeated is applied to the common electrode 37 in a period corresponding to the image display step. According to this common swing driving method, since the potentials applied to the pixel electrodes and the common electrode 37 can be controlled to two values, the high potential H and the low potential L. Accordingly, it is possible to realize low voltage operation and to simplify the circuit structure.

In this manner, in the pixel 40A, potential difference is created between the pixel electrode 35*a* which is maintained at the ground potential 0V and the common electrode 37 within a period in which the common electrode 37 is at the high potential +Vo, and therefore the black particles 26 charged positive are drawn to the pixel electrode 35*a* which is maintained at a relatively low potential and the white particles 27 charged negative area drawn to the common electrode 37 which is maintained at a relatively high potential. As the above operation is repeated in the period of the image display step ST21, the pixel 40A displays white.

During a period in which the common electrode 37 is maintained at the high potential +Vo, no potential difference is created between the pixel electrode 35*b* maintained at the high potential and the common electrode 37. Accordingly, the display of the pixel 40B does not change.

On the other hand, in the pixel 40B, during a period in which the common electrode 37 is maintained at the low potential (ground potential), the potential difference is created between the pixel electrode 35*b* maintained at the high potential +Vo and the common electrode 37, and therefore the white particles 27 are drawn to the pixel electrode 35*b* and the black particles 26 are drawn to the common electrode 37. As the above operation is repeated during the image display step ST21, the pixel 40B displays black. During a period in which the common electrode 37 is maintained at the ground potential, no potential difference is created between the pixel electrode 35*a* maintained at the low potential (ground potential) and the common electrode 37, and therefore the display of the pixel 40A does not change.

In this manner, an image is displayed on the display portion 5 on the basis of the image data.

Next, the driving method progresses to the image maintaining step ST22. As shown in FIG. 7, as for the pixel electrode 35 of the pixel 40 to which the ground potential is input, the high potential +Vo is input to the pixel electrode 35 from the pixel electrode drive circuit 60. In such a pixel, the high potential +Vo is input to the common electrode 37 from the common electrode drive circuit 64.

Figure 8B:
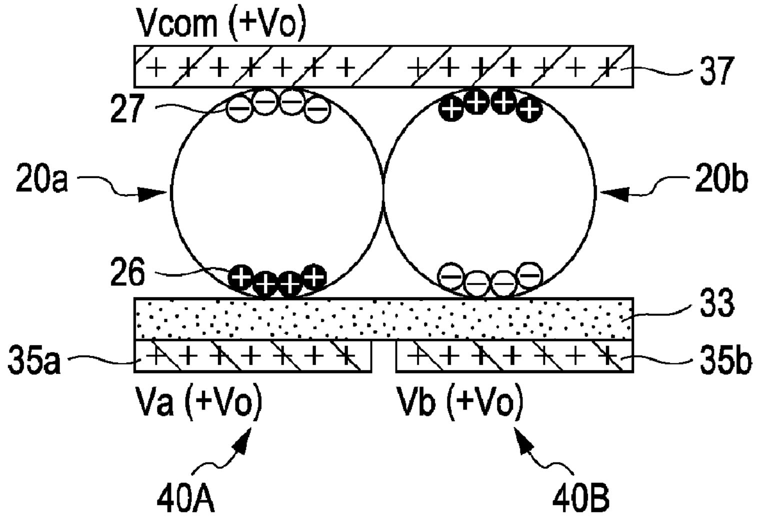

As shown in FIG. 7 and FIG. 8B, the pixel electrodes 35*a* and 35*b* and the common electrode 37 become the high potential +Vo, and therefore the potential difference between the electrodes surrounding the microcapsules 20*a* and 20*b* becomes zero. Accordingly, migration of the charges via the adhesive layer 33 and the microcapsules 20*a* and 20*b* does not occur, and the good display state which is determined in the image display step ST21 can be maintained.

In the case of this embodiment, as shown in FIG. 7, the image display step ST21 ends within a period in which the common electrode 37 is maintained at the ground potential. That is, the image display step ST21 ends within a period in which the black display pixels 40 (40N) in the display portion 5 are driven. Further, in the image maintaining step ST22, both of the potential of the common electrode 37 and the potential of the pixel electrode 35*a* of the pixel 40A which displays white is raised to the high potential +Vo from the ground potential.

By this driving method, in the pixel 40B which displays black, the high and low relationship between the potential +Vo of the pixel electrode 35*b* and the potential GND to +Vo of the common electrode 37 can be maintained. With this operation, in the pixel 40B which displays black, it is possible to suppress migration of the electrophoretic particles 26 and 27 which is attributable to change of the potentials of the pixel electrode 35 and the common electrode 37 after the image display. Generally the color fade out outstands in the pixel 40 which displays black. Accordingly, since it is possible to maintain the high quality black display by adopting the above driving method, it is possible to more effectively prevent the color fade-out from occurring.

In the second driving method, it is preferable that, in the pixel 40A which displays white, timing Tm2 (potential raising timing) at which the potential of the common electrode 37 is raised comes earlier than timing Tm1 at which the potential of the pixel electrode 35*a* is raised. When the image display step ST21 ends, the potential Va of the pixel electrode 35*a* and the potential Vcom of the common electrode 37 become the ground potential. In this pixel, if the potential Va of the pixel electrode 35*a* begins to rise, since the potential of the pixel electrode 35*a* becomes relatively high in comparison with the potential of the common electrode 37, the pixel 40A which displays white falls to the potential state of the black display. As a result, the electrophoretic particles 26 and 27 can migrate.

For such a reason, in the pixel 40A which displays white, since the pixel electrode 35*a* can maintain the relatively low potential in comparison with the common electrode 37 by such setting of the timings Tm1 and Tm2, it is possible to effectively suppress the color fade-out in the pixel 40A which displays white.

In the second driving method, as shown in FIG. 7, a power off step which causes the pixel electrodes 35*a* and 35*b* and the common electrode 37 to fall to the high impedance state may be performed after the image maintaining step ST22. Thus, it is possible to maintain the good display state without consuming the power by stopping the potential input to each of the electrodes.

In the above description, the potential Va of the pixel electrode 35*a* and the potential Vcom of the common electrode 37 are raised to the high potential +Vo in the image maintaining step ST22. However, the potentials of the pixel electrodes 35*a* and 35*b* and the common electrode 37 which are maintained during the image maintaining step ST22 can be arbitrarily selected rather than the potentials are set to the high potential +Vo. For example, all of the potentials of the pixel electrodes 35*a* and 35*b* and the common electrode 37 may be the ground potential or a midway potential between the ground potential and the high potential +Vo.

Accordingly, the potential of the common electrode 37 when the image display step ST21 ends also can be arbitrarily selected. However, since there is the strong chance that the color fade-out occurs during the transition from the image display step ST21 to the image maintaining step ST22 in the case in which the common electrode 37 is maintained at a certain potential when the image display step ST21 ends, it is preferable that the potential of the common electrode 37 may be selected according to the potential maintained in the image maintaining step ST22.

Second Embodiment

Next, a second embodiment of the invention will be described with reference to the drawings. The overall structure of an electrophoretic display device 200 according to this embodiment is almost the same as that of the electrophoretic display device 100 shown in FIG. 1, but is different from a point that the electrophoretic display device 200 includes a controller 63 having a structure shown in FIG. 9.

Figure 9:
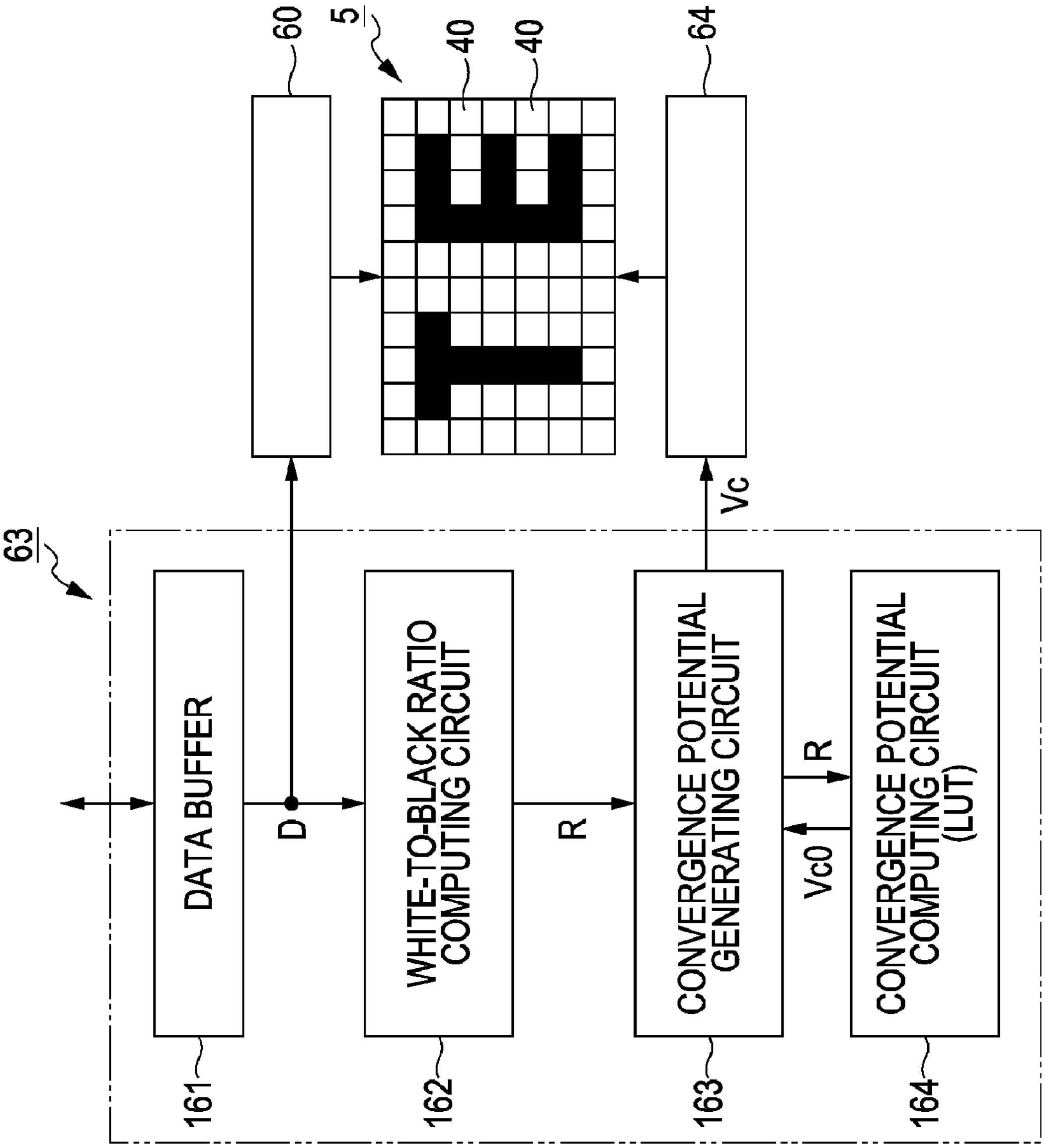
FIG. 9 is a schematic view illustrating an electrophoretic display device according to a second embodiment.

FIG. 9 is a block diagram illustrating the controller 63 provided in the electrophoretic display device 200. The controller 63 includes a data buffer 161, a white-to-black ratio computing circuit 162, a convergence potential generating circuit 163, and a convergence potential computing circuit 164. FIG. 9 shows only circuits needed for describing the embodiment of the invention, but a structure of the real controller 63 may not be identical to the structure of FIG. 9.

The data buffer 161 maintains image data D received from an upper-layered device and sends the image data to the pixel electrode drive circuit 60 and the white-to-black ratio computing circuit 162.

The white to black ratio computing circuit 162 analyzes the image data D received from the frame memory 161, and calculates a ratio of pixel data "1"s and pixel data "0"s which constitute the image data.

The obtained white-to-black ratio R is sent to the convergence potential generating circuit 163. The convergence potential generating circuit 163 receives the white-to-black ratio R from the white-to-black ratio computing circuit 162, sends it to the convergence potential computing circuit 164, and acquires the convergence potential Vc corresponding to the white-to-black ratio R from the convergence computing circuit 164. The obtained convergence potential Vc is supplied to the common electrode drive circuit 64.

The convergence potential computing circuit 164 receives the white-to-black ratio R from the convergence potential generating circuit 163 and outputs the convergence potential Vc corresponding to the white-to-black ratio R.

The convergence potential computing circuit 164 may include a look-up table LUT in which white-to-black ratios R and convergence potentials Vc are matched and a circuit which references the look-up table LUT. Data group constituting the look-up table LUT includes measured values of the convergence potential Vc which are measured by displaying image data D having a different white-to-black ratio R on the display portion 5. In the case in which the measured values of the convergence potential Vc are abnormal, the data group may further include calculated values for complementing the measured values. Alternatively, the convergence potential computing circuit 164 may be a computing circuit having a function f(R) for obtaining the convergence potential Vc from the white-to-black ratio R.

Here, the convergence potential Vc will be described with reference to FIG. 10 and FIGS. 21A to 21C.

Figure 21A:
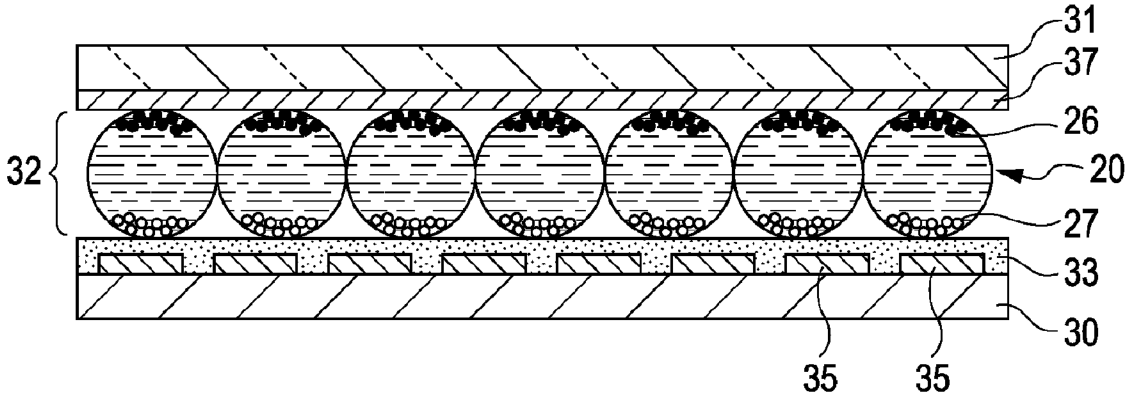
FIGS. 21A, 21B, and 21C are explanatory views relating to color fade-out.
Figure 21B:
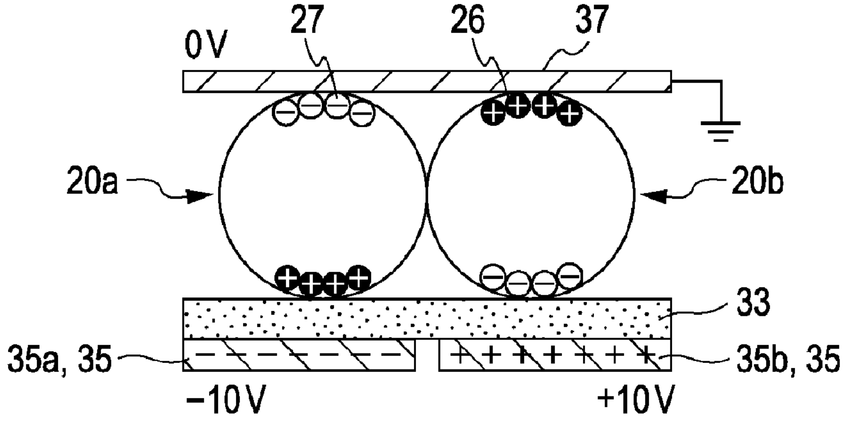
Figure 21C:
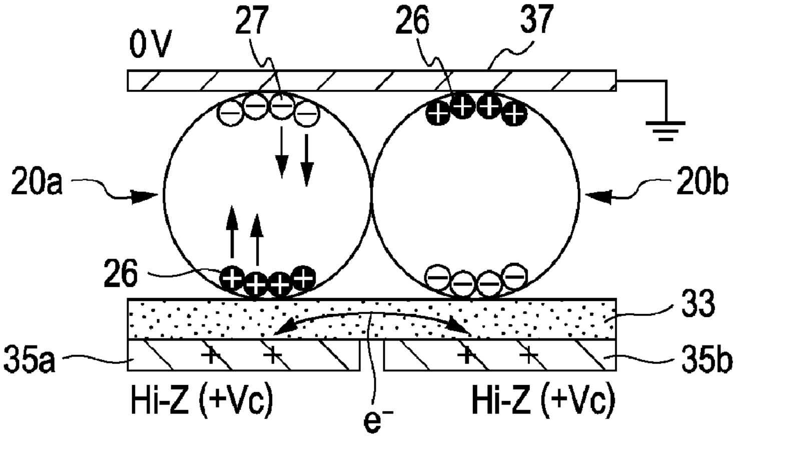

As shown in FIGS. 21A to 21C, if the pixel electrodes 35*a* and 35*b* fall to the high impedance state after the pixel electrodes 35*a* and 35*b* are applied with the voltages for image display, charges migrate between the pixel electrodes 35*a* and 35*b* having different potentials. The migration of the charges ends when all of the pixel electrodes 35 which share the adhesive layer 33 come to have the same potential. At this time, the potential of the pixel electrode 35 becomes the convergence potential Vc.

Figure 10:
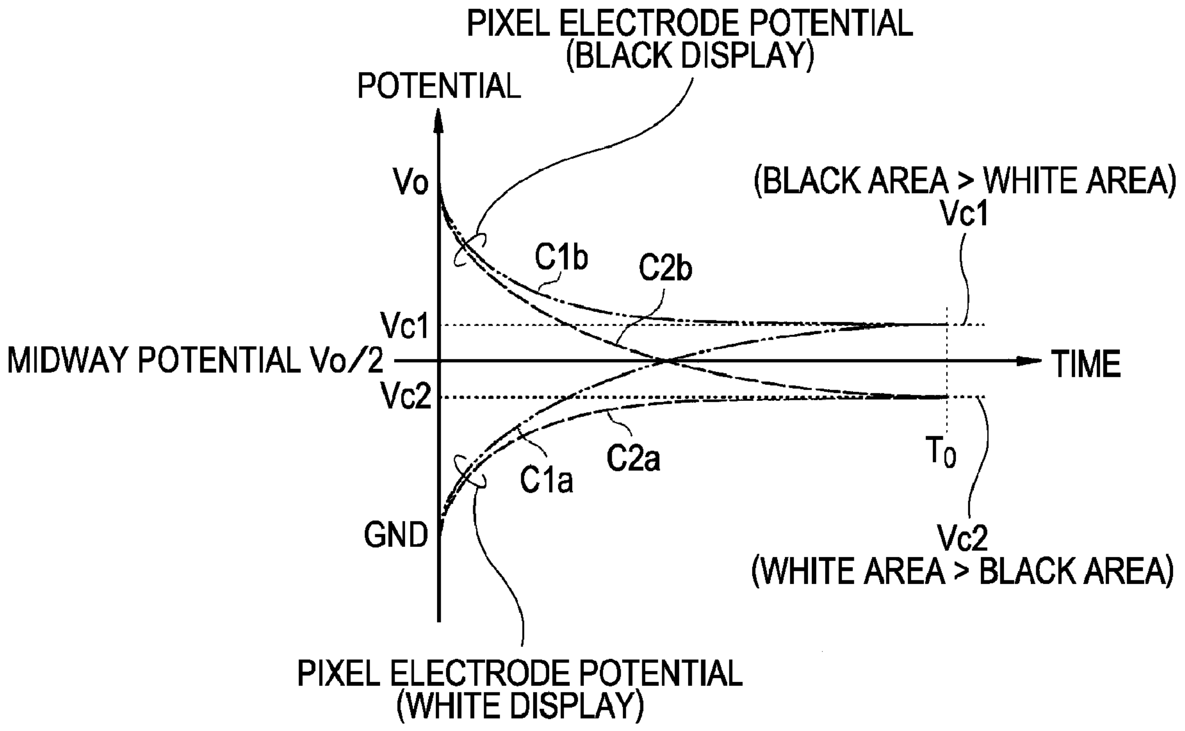
FIG. 10 is an explanatory view illustrating a convergence voltage Vc.

The convergence voltage Vc may not be always the constant potential but change according to the potential balance between the pixel electrodes 35 in the display portion 5. That is, the convergence voltage varies according to the image data displayed on the display portion 5. FIG. 10 is an explanatory view of the convergence potential Vc. A lateral axis of FIG. 10 indicates time and a vertical axis of FIG. 10 indicates potential. The intersection of these axes means the time when the pixel electrodes 35 fall the high impedance state.

As shown in FIG. 10, in a moment that the pixel electrodes 35 become the high impedance state, the potential of the pixel electrode 35 of the white display pixel 40 is the ground potential GND (0V), and the potential of the pixel electrode 35 of the black display pixel 40 is the high potential +Vo. Accordingly, after the pixel electrodes 35 fall to the high impedance state, the potential of the pixel electrode 35 of the white display pixel 40 rises with the time and the potential of the pixel electrode 35 of the black display pixel 40 falls with the time.

However, the potentials of the pixel electrodes 35 do not always change in the same way but change differently according to the relationship between the number of black display pixels 40 and the number of white display pixels 40 in the display portion 5.

In the case in which the number of the black display pixels 40 is larger than the number of the white display pixel 40, the potential of the pixel electrodes 35 of the white display pixels 40 changes along a curved line C1*a* and the potential of the pixel electrodes 35 of the black display pixels 40 changes along a curved line C1*b*. That is, the potential converges to the potential Vc1 (convergence potential) which is higher than a midway potential Vo/2 between the high potential +Vo and the ground potential.

On the other hand, in the case in which the number of the white display pixels 40 is larger than the number of the black display pixels 40, the potential of the pixel electrodes 35 of the white display pixels 40 changes along a curved line C2*a*, and the potential of the pixel electrodes 35 of the black display pixels 40 changes along a curved line C2*b*. Accordingly, the potential converges to the potential Vc2 (convergence potential) which is lower than the midway potential Vo/2.

In the case in which the numbers of the black display pixels 40 and the white display pixels 40 in the display portion 5 are the same, the convergence potential becomes the midway potential Vo/2.

Figure 11:
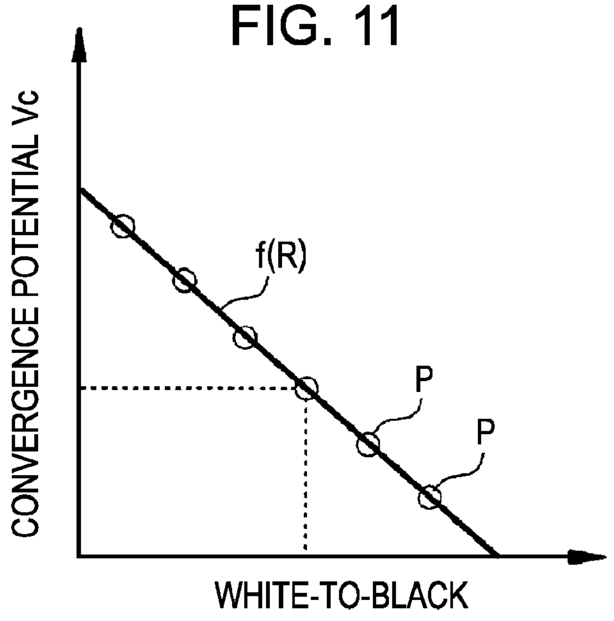
FIG. 11 is a graph illustrating a relationship between the convergence voltage Vc and a white-to-black ratio R.

The convergence potential Vc relates to the ratio of the number of the white display pixels 40 and the number of the black display pixels 40 in the display portion 5 and shows the change of FIG. 11. The convergence potential computing circuit 164 may adopt a structure including the look-up table LUT containing data group composed of measured values P of FIG. 11. Alternatively, the convergence potential computing circuit 164 may adopt a structure including a look-up table LUT containing the measured values P and calculated values which can complement the measured values P.

Further, in the case in which the function between the convergence potential Vc and the white-to-black ratio R can be obtained on the basis of the measured values P, the convergence potential computing circuit 164 may have a structure containing the function f(R).

Driving Method

Next, a driving method of the electrophoretic display device according to the second embodiment will be described with reference to FIGS. 9 to 12.

Figure 12:
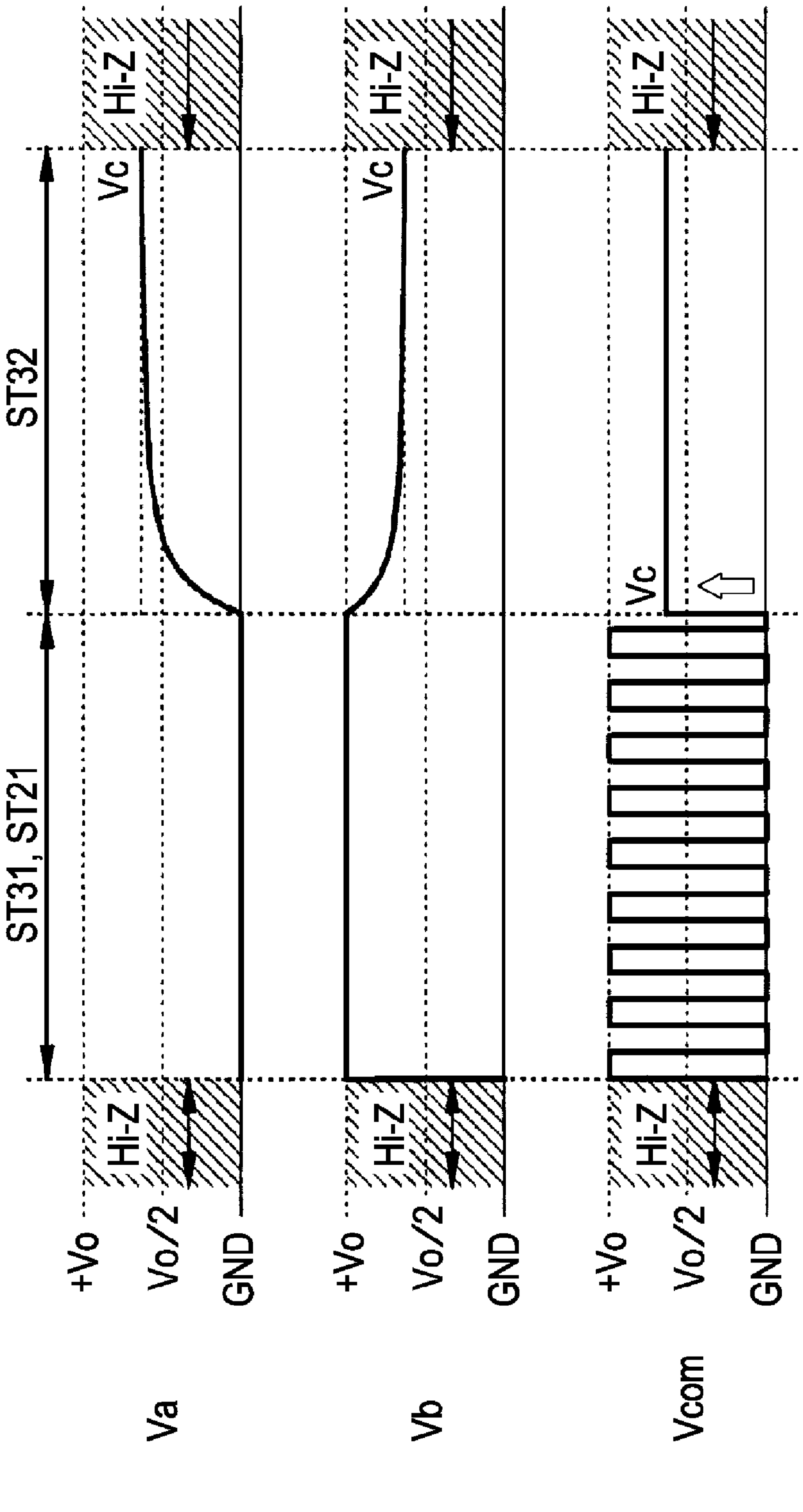
FIG. 12 is a timing chart for explaining a driving method according to the second embodiment.
Figure 13A:
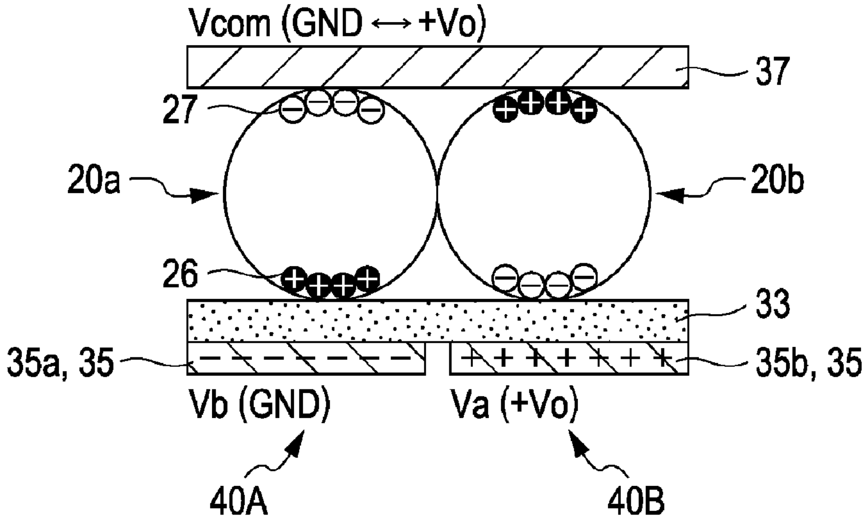
FIGS. 13A and 13B are enlarged views illustrating pixels and for explaining the driving method according to the second embodiment.
Figure 13B:
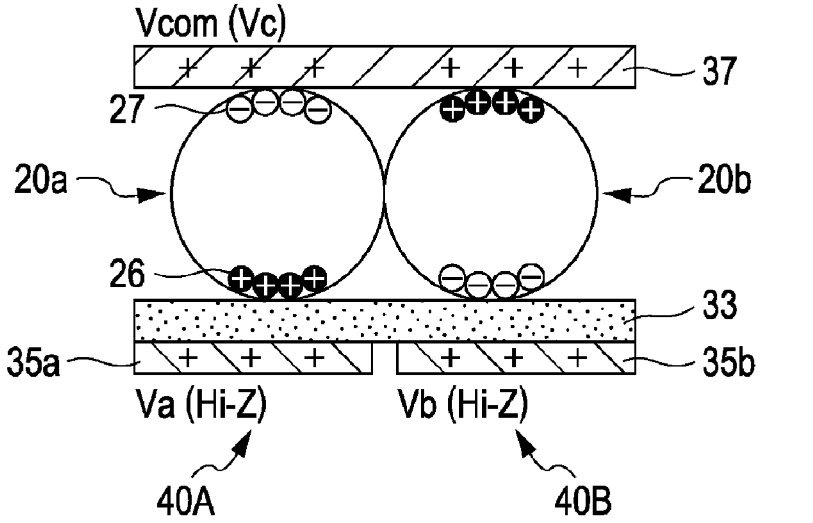

FIG. 12 is a timing chart showing the driving method of the electrophoretic display device 200. FIG. 13 schematically shows two pixels 40. FIGS. 13A and 13B are views corresponding to FIGS. 8A and 8B of the first embodiment, in which the structure of the pixels 40A and 40B of FIGS. 13A to 13B is the same as that of the pixels of FIGS. 6A and 6B.

As shown in FIG. 12, the driving method of the electrophoretic display device according to the second embodiment includes an image display step ST31 and an image maintaining step ST32. In these figures, Va is a potential of the pixel electrode 35*a*, Vb is a potential of the pixel electrode 35*b*, and Vcom is a potential of the common electrode 37.

The image display step ST31 may be the same as the image display step ST11 or ST21 according to the first embodiment. FIG. 13 shows the case in which the image display step ST31 is the same as the image display step ST21 according to the second driving method of the first embodiment. However, the image display step ST31 may be the same as the image display step ST11 according to the first driving method. If the image display to the display portion 5 by the image display step ST31 ends, the image maintaining step ST32 begins.

Next, if the image maintaining step ST32 begins, as shown in FIG. 12 and FIG. 13B, the pixel electrodes 35*a* and 35*b* fall to the high impedance state in which the pixel electrodes 35*a* and 35*b* are electrically disconnected from the pixel electrode drive circuit 60, and the common electrode 37 is supplied with the convergence potential Vc from the common electrode drive circuit 64.

The convergence potential Vc input to the common electrode 37 is input in the following procedure. In the image display step ST31, as shown in FIG. 9, the image data D is output to the pixel electrode drive circuit 60 from the data buffer 161, and the display portion 5 displays the image as the potentials based on the image data D are input to the pixels 40.

On the other hand, the image data D is also supplied to the white-to-black ratio R computing circuit 162, and the white-to-black ratio computing circuit 162 calculates the white-to-black ratio from the image data D and supplies the white-to-black ratio R to the convergence potential generating circuit 163. For example, in the case in which the image data D displays a text image TE shown in FIG. 9 to the display portion 5, the number of pixel data "0" corresponding to the black display is 18 and the number of pixel data "1" corresponding to the white display is 52. Accordingly, 2.9 ($R=52/18\cong 2.9$) is output as the white-to-black ratio R.

The convergence potential generating circuit 163 which receives the white-to-black ratio R outputs the white-to-black ratio R to the convergence potential computing circuit 164. The convergence potential computing circuit 164 references the LUT using the received white-to-back ratio R and acquires a volume value Vc0 of the convergence potential Vc. Then, the acquired volume value Vc0 is returned to the convergence potential generating circuit 163. Alternatively, the convergence potential computing circuit 164 calculates the volume value Vc0 using the function f(R) for obtaining the volume value Vc0 from the received white-to-black ratio R, and feeds back the obtained volume value Vc0 to the convergence potential generating circuit 163.

The convergence potential generating circuit 163 received the volume value Vc0 generates the convergence potential Vc on the basis of the volume value Vc0 and supplies it to the common electrode drive circuit 64. The common electrode drive circuit 64 inputs he convergence potential Vc to the common electrode 37 in the image maintaining step ST32.

With this embodiment, in the image maintaining step ST32, potential input to the pixel electrodes 35 is not performed and therefore the pixel electrodes 35 fall to the high impedance state. Accordingly, as shown in FIG. 12, after the image maintaining step ST32 begins the potential Va and the potential Vb change with the time. In the example shown in FIG. 12, the potentials Va and Vb changes gradually approaching toward the convergence potential Vc which is slightly higher than the midway potential Vo/2 from the ground potential and the high potential +Vo, respectively.

In the driving method of this embodiment, the potential Vcom of the common electrode 37 is set to the convergence potential Vc. With this operation, although the potentials Va and Vb change with the time, the high and low relationship between the potential Va and the potential Vcom, or the high and low relationship between the potential Vb and the potential Vcom is not reversed but the potentials Va and Vb only becomes close to the potential Vcom (convergence potential Vc) of the common electrode 37.

According to this embodiment, in the image maintaining step ST32, it is possible to maintain the potential state of the image display step ST31 (i.e. the high and low relationship between potentials of the pixel electrodes 35*a* and 35*b* and the common electrode 37), and therefore it is possible to effectively prevent the color fade-out from occurring. In the image maintaining step ST32, the potential Vcom of the common electrode 37 and the potentials Va and Vb of the pixel electrodes 35 becomes the same level to the potential Vc at last.

In this embodiment, the timing at which the convergence potential Vc is input to the common electrode 37 is important. For example, in the example of FIG. 12, the image display step ST31 ends while the common electrode 37 has the ground potential. In this case, if the pixel electrodes 35*a* and 35*b* fall to the high impedance state before the convergence potential Vc is input to the common electrode 37, the potential Va of the pixel electrode 35*a* rises but the potential Vcom of the common electrode 37 is maintained at the ground potential. Accordingly, the high and low relationship between potentials of the pixel electrode 25*a* and the common electrode 37 changes in reverse to the high and low relationship of the image display step ST31, so that the color fade-out occurs.

Accordingly, in the driving method of this embodiment, it is preferable that the input of the convergence potential Vc to the common electrode 37 is prior to the high impedance state of the pixel electrodes 35*a* and 35*b*.

If the common electrode 37 is set to the midway potential Vo/2 when the image display step ST31 ends, the high and low relationship between the potentials Va and Vb of the pixel electrodes 35*a* and 35*b* and the potential of the common electrode 37 is not reversed within the period in which the potentials Va and Vb of the pixel electrodes 35*a* and 35*b* becomes the midway potential Vo/2. Accordingly, although the input of the convergence potential Vc to the common electrode 37 is subsequent to the high impedance state of the pixel electrodes 35*a* and 35*b*, the color fade-out does not occur.

In the driving method according to the second embodiment, as shown in FIG. 12, a power off step which causes the pixel electrodes 35*a* and 35*b* and the common electrode 37 to fall to the high impedance state may be performed after the image maintaining step ST32. In this manner, it is possible to maintain a good display state by stopping the potential input to each of the electrodes without power consumption.

Modification

Each of the above embodiments is described with reference to the segment type electrophoretic display device, but the electrophoretic display device according to the invention may be a static random access memory (SRAM) type electrophoretic display in which each pixel is provided with an latch circuit, or a dynamic random access memory (DRAM) type electrophoretic display device in which each pixel is provided with a selection transistor and a capacitor. Hereinafter, such examples will be described with reference to FIGS. 14 to 17. In FIGS. 14 to 17 and the figures referenced in the above embodiments, like numbers reference like elements, and description about like elements will be omitted.

Figure 14:
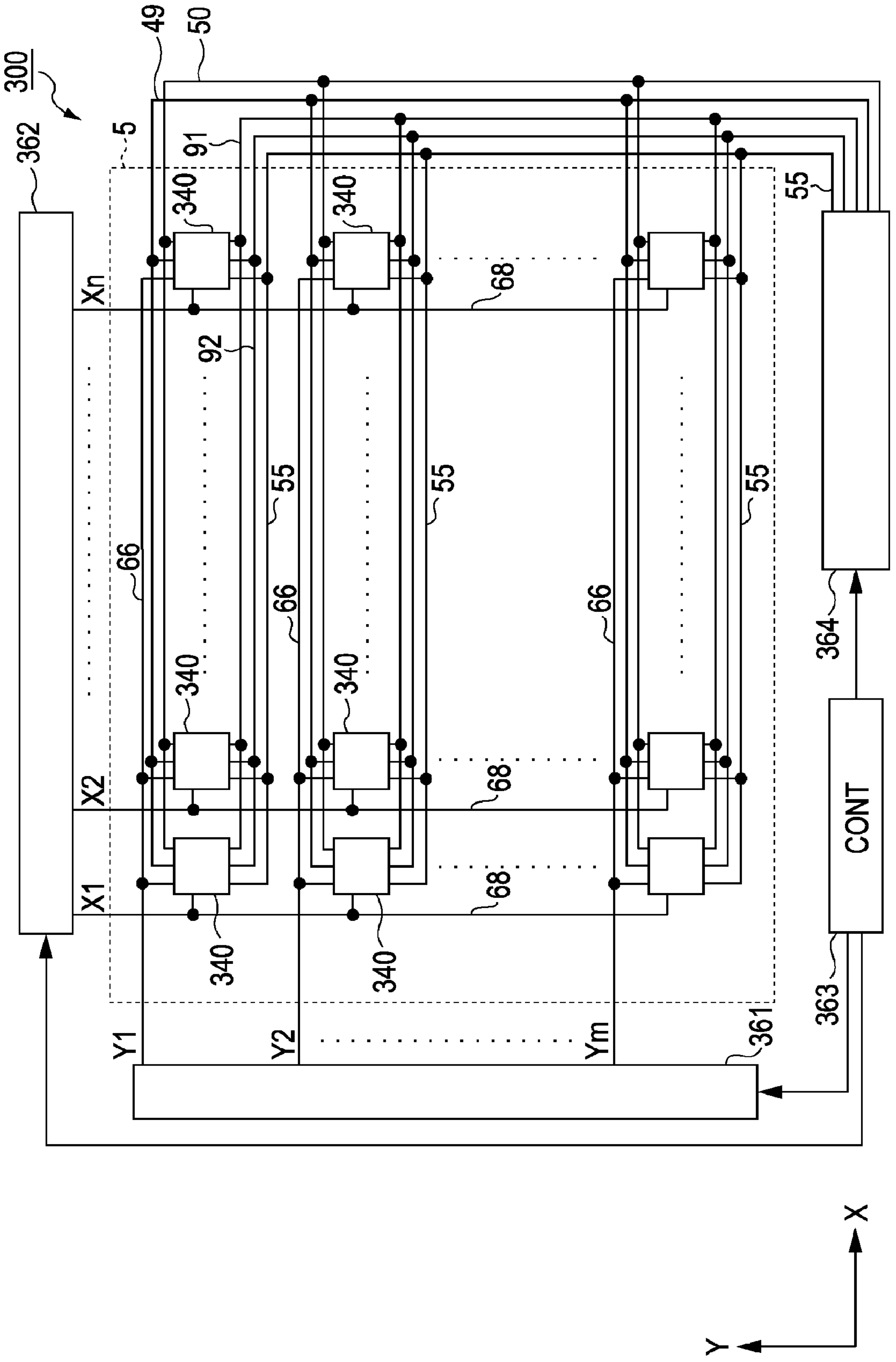
FIG. 14 is a schematic view illustrating an electrophoretic display device according to a modification of the invention.

FIG. 14 shows an overall structure of an active matrix type electrophoretic display device 300.

The electrophoretic display device 300 includes a display portion 5 in which a plurality of pixels 340 is arranged in a matrix. A scan line drive circuit 361, a data line drive circuit 362, a controller (control portion) 363, and a common power source modulation circuit 364 are placed around the display portion 5. The scan line drive circuit 361, the data line drive circuit 362, and the common power source modulation circuit 364 are connected to the controller 363. the controller 363 comprehensively controls these circuits on the basis of image data and a synchronous signal supplied from an upper-layered device.

The display portion 5 is provided with a plurality of scan lines 66 extending form the scan line drive circuit 361, a plurality of data lines 68 extending from the data line drive circuit 362, and pixels 340 disposed corresponding to intersections of the scan lines 66 and the data lines 68. The scan line drive circuit 361 sequentially selects m rows of the scan lines 66 from a first scan line Y1 to the m-th scan line Ym, and supplies a selection signal which determines on timing of the selection transistors 41(see FIG. 15) disposed in the pixels 340 via the selected scan line 66 under the control by the controller 363. The data line drive circuit 362 supplies the image signal to the pixel 40 which determines a single bit of pixel data during a selection period of the scan line 66.

The display portion 5 is further provided with a low potential power source line 49 extending from the common power source modulation circuit 364, a high potential power source line 50, a common electrode wiring 55, a first control line 91, and a second control line 92. Each of the wirings is connected to the pixel 340. The common power source modulation circuit 364 generates various signals to be supplied to each of the wirings and performs electrical connection and disconnection (causing a high impedance state) of each of the wirings under the control by the controller 363.

Figure 15:
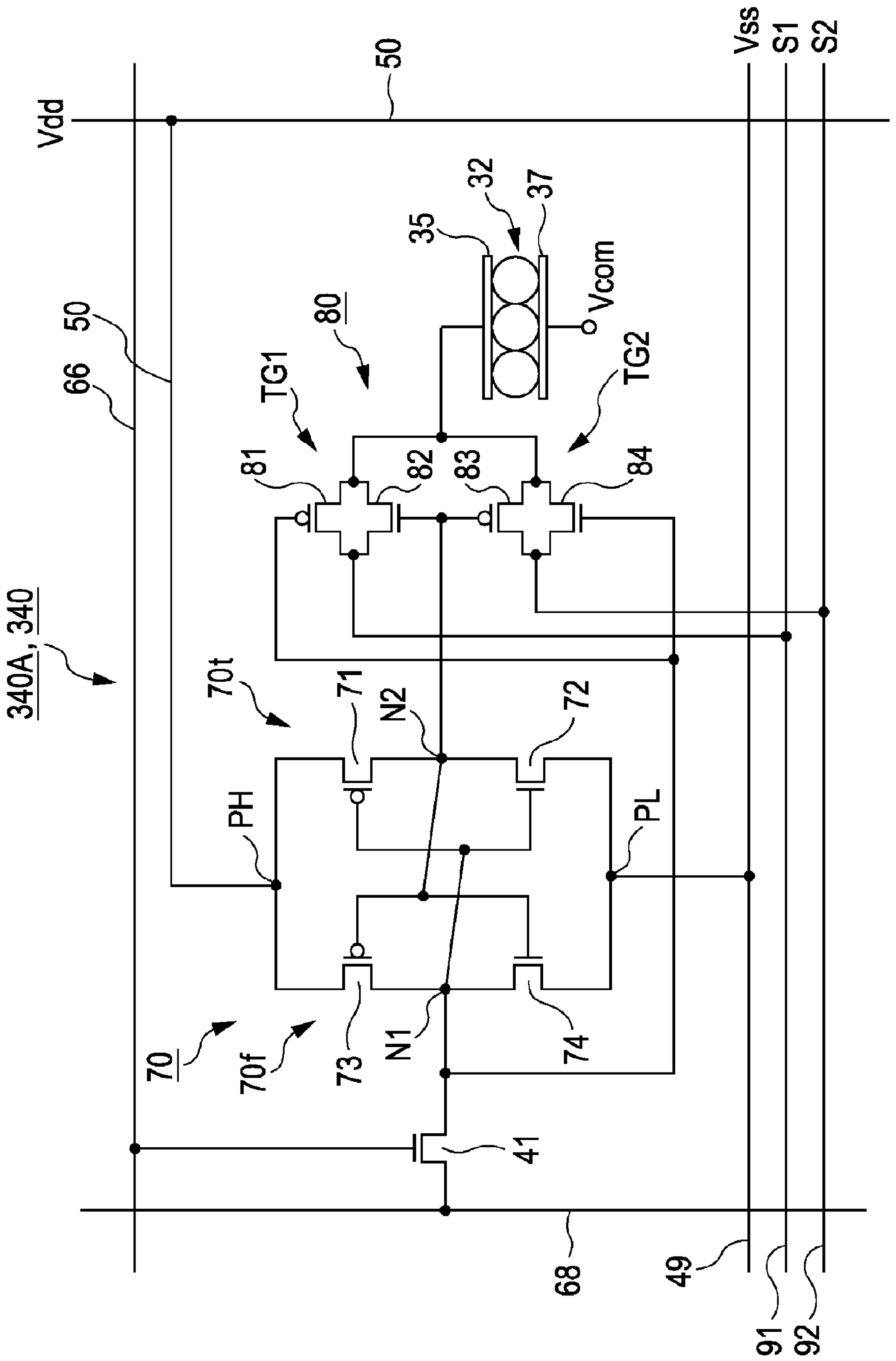
FIG. 15 is a view illustrating a pixel circuit according to a modification.

FIG. 15 shows a circuit structure of a pixel 340A which can be applied to the pixel 340.

The pixel 340A includes a selection transistor 41, a latch circuit 70, a switch circuit 80, an electrophoretic element 32, a pixel electrode 35, and a common electrode 37. The scan line 66, the data line 68, the low potential power source line 49, the high potential power source line 50, the first control line 91, and the second control line 92 are placed to surround this element. The pixel 340A has the SRAM type structure which maintains the pixel signal as a potential by the latch circuit 70.

The selection transistor 41 is a pixel switching element composed of a negative metal oxide semiconductor (N-MOS) transistor. A gate terminal of the selection transistor 41 is connected to the scan line 66, a source terminal of the selection transistor 41 is connected to the data line 68, and a drain terminal of the selection transistor 41 is connected to a data input terminal N1 of the latch circuit 70. The data input terminal N1 and a data output terminal N2 of the latch circuit 70 are connected to the switch circuit 80. The switch circuit 80 is connected not only connected to the pixel electrode 35 but also to the first and second control lines 91 and 92. The electrophoretic element 32 is interposed between the pixel electrode 35 and the common electrode 37.

The latch circuit 70 includes a transfer inverter 70*t* and an feed back inverter 70*f*, each of them is a C-MOS inverter. The transfer inverter 70*t* and the feed back inverter 70*f* have a loop structure in which an output of each of them is connected to an input of the opponent of them. These inverters are supplied with a power source voltage the high potential power source line 50 via a high potential power source terminal PH connected to the high potential power source line 50 and the low potential power source line 49 via a low potential power source terminal PL connected to the low potential power source line 49.

The transfer inverter 70*t* includes a positive metal oxide semiconductor (P-MOS) transistor 71 and an N-MOS transistor 72 of which drain terminals are connected to the data output terminal N2. A source terminal of the P-MOS transistor 71 is connected to the high potential power source terminal PH and a source terminal of the N-MOS transistor 72 is connected to the low potential power source terminal PL. Gate terminals of the P-MOS transistor 71 and the N-MOS transistor 72 (input terminal of the transfer inverter 70*t*) are connected to the data input terminal N1 (output terminal of the feed back inverter 70*f*).

The feed back inverter 70*f* includes a P-MOS transistor 73 and an N-MOS transistor 74 of which drain terminals are connected to the data input terminal N1. Gate terminals of the P-MOS transistor 73 and N-MOS transistor 74 (input terminal of the feed back inverter 70*f*) are connected to the data output terminal N2 (output terminal of the transfer inverter 70*t*).

When an image signal with a high level H (pixel data "1") is memorized in the latch circuit 70 having the above-described structure, a signal with a low level L is output from the data output terminal N2 of the latch circuit 70. Conversely, when an image signal with a low level L (pixel data "0") is memorized in the latch circuit 70, a signal with a high level H is output from the data output terminal N2 of the latch circuit 70.

The switch circuit 80 includes a first transmission gate TG1 and a second transmission gate TG2. The first transmission gate TG1 is composed of a P-MOS transistor 81 and an N-MOS transistor 82. Source terminals of the P-MOS transistor 81 and N-MOS transistor 82 are connected to the first control line 91, and drain terminals of the P-MOS transistor 81 and N-MOS transistor 82 are connected to the pixel electrode 35. A gate terminal of the P-MOS transistor 81 is connected to the data input terminal N1 of the latch circuit 70, and a gate terminal of the N-MOS transistor 82 is connected to the data output terminal N2 of the latch circuit 70.

The second transmission gate TG2 is composed of a P-MOS transistor 83 and an N-MOS transistor 84. Source terminals of the P-MOS transistor 83 and N-MOS transistor 84 are connected to the second control line 92, and drain terminals of the P-MOS transistor 83 and N-MOS transistor 84 are connected to the pixel electrode 35. A gate terminal of the P-MOS transistor 83 is connected to the data output terminal N2 of the latch circuit 70 and a gate terminal of the N-MOS transistor 84 is connected to the data input terminal N1 of the latch circuit 70.

In the case in which the image signal with a low level L (pixel data "0") is memorized in the latch circuit 70 and a signal with a high level H is output from the data output terminal N2, the first transmission gate TG1 becomes ON state and therefore a potential S1 supplied via the first control line 91 is input to the pixel electrode 35. Conversely, in the case in which the image signal with a high level H (pixel data "1") is memorized in the latch circuit 70 and a signal with a low level L is output from the data output terminal N2, the second transmission gate TG2 becomes ON state and therefore a potential S2 supplied via the second control line 92 is input to the pixel electrode 35.

The electrophoretic display device 300 drives the electrophoretic element 32 on the basis of the potential difference between the potentials S1 and S2 input to the pixel electrode 35 and the potential Vcom of the common electrode 37, and displays an image on the display portion 5. Since the electrophoretic display device 300 is also driven by the driving method according to the first and second embodiments, it is possible to suppress the color fade-out after the image display and to obtain a high quality display.

Figure 16:
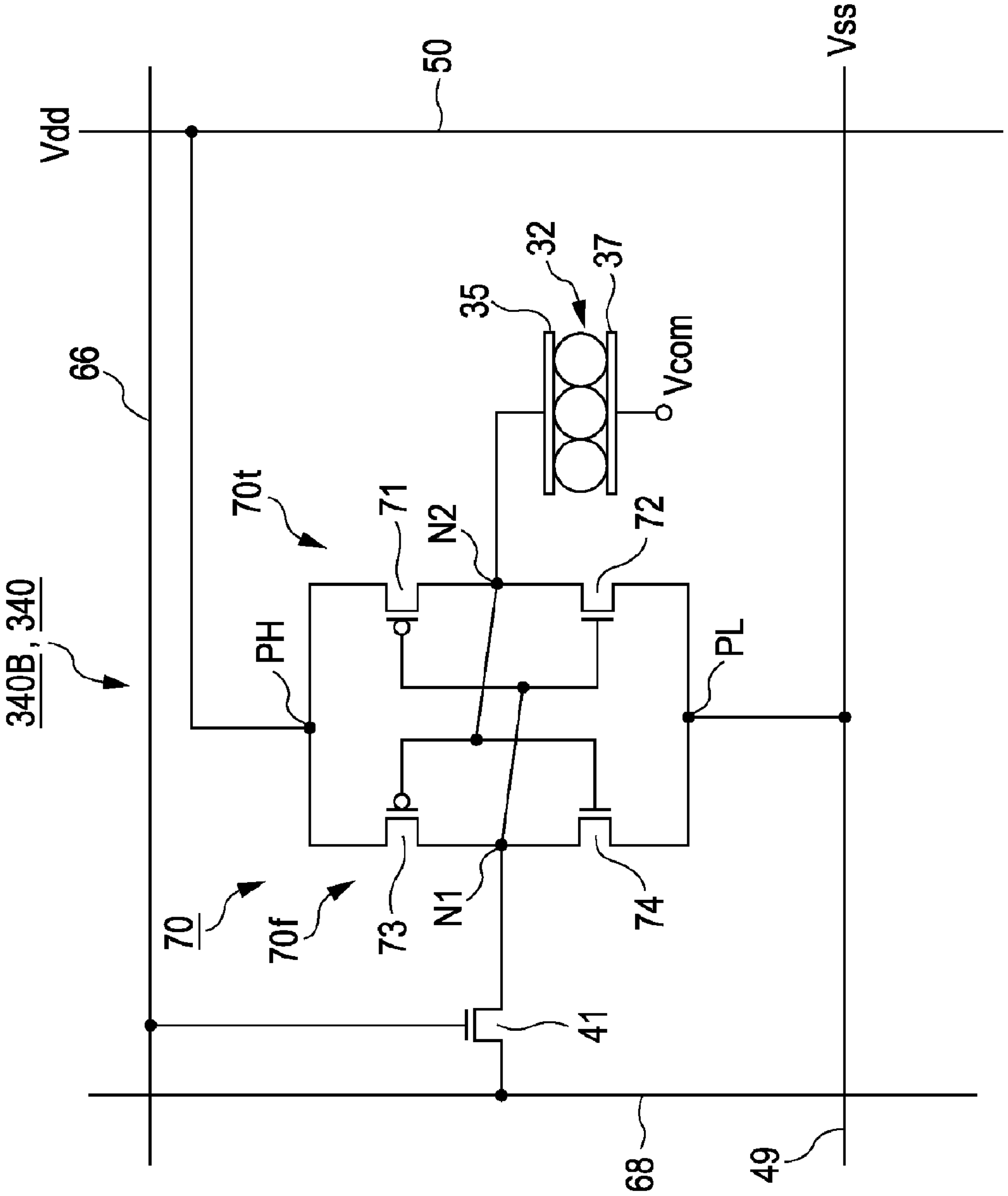
FIG. 16 is a view illustrating a pixel circuit according to another modification.

The pixel 340 of the electrophoretic display device 300 may have the structure of the pixel 340B shown in FIG. 16. The pixel 340B includes almost all member of the pixel 340A shown in FIG. 15 except for the switch circuit 80. Owing to the omission of the switch circuit 80, a data output terminal N2 of a latch circuit 70 is connected to a pixel electrode 35. Since the pixel 340B does not include the switch circuit 80, the first control line 91 and the second control line 92 relating to the switch circuit 80 are also unnecessary.

Figure 17:
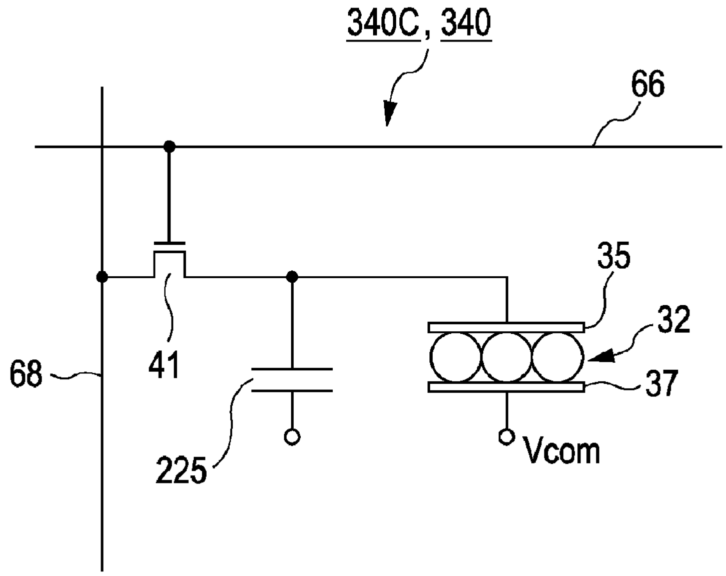
FIG. 17 is a view illustrating a pixel circuit according to a further modification.

The pixel 340 of the electrophoretic display device 300 may have a structure of a pixel 340C shown in FIG. 17. The pixel 340C includes a selection transistor 41, a capacitor 225, a pixel electrode 35, an electrophoretic element 32, and a common electrode 37. That is, the pixel 340C has a DRAM type pixel structure.

When adopting the pixel 340C as a pixel of the electrophoretic display device 300, the latch circuit 70 and the wirings (the high potential power source line 50, the low potential power source line 49, the first control line 91, and the second control line 92) connected to the switch circuit 80 shown in FIG. 14 are unnecessary.

In the case in which the electrophoretic display device 300 has a pixel structure such as the pixel 340B or the pixel 340C, the driving method relating to the first embodiment and the second embodiment can be applied. Accordingly, adopting such driving method, it is possible to suppress the color fade-out after the image display and to obtain a high quality display. When the driving methods relating to the first and second embodiments are adopted, in these pixels, since the pixel electrodes are at the identical potential, the off current of the selection transistor does not occur and it is possible to prevent the color fade-out from occurring.

Electronic Apparatus

Figure 18:
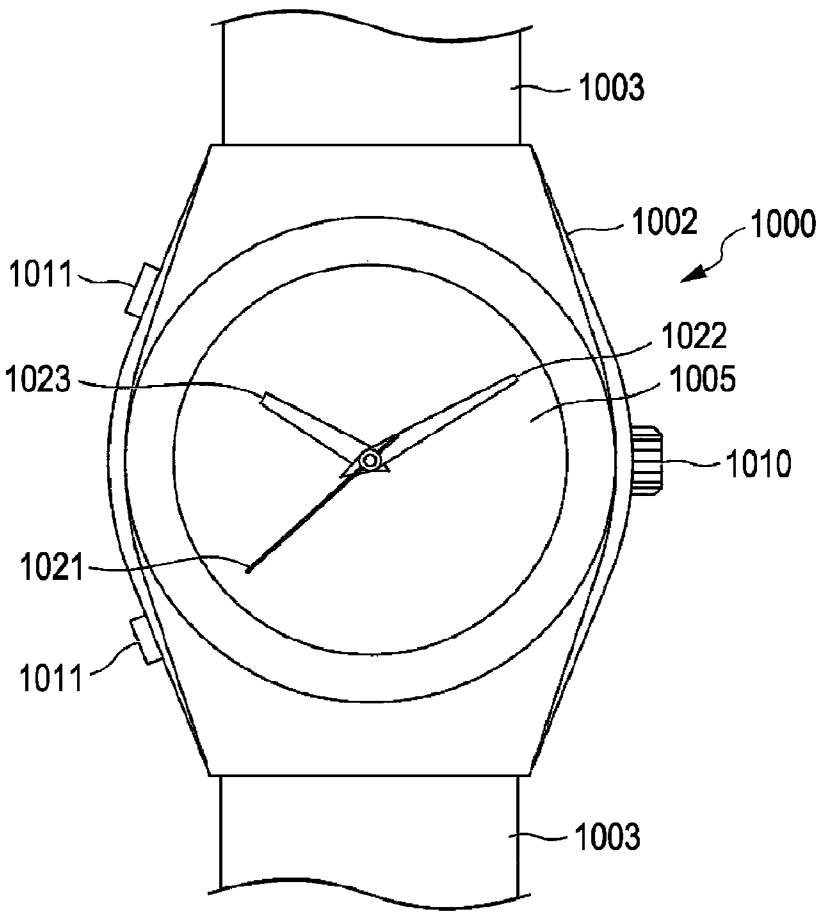
FIG. 18 is a view illustrating a write watch which is an example of an electronic apparatus.

Next, the case in which each of the electrophoretic display devices 100 to 300 according to the above-mentioned embodiments is applied to an electronic apparatus will be described. FIG. 18 is a front view illustrating a wrist watch 1000. The wrist watch 1000 includes a watch case 1002, a pair of hands 1003 connected to the watch case 1002. The front surface of the watch case 1002 is provided with a display portion 1005 which is composed of any one of the electrophoretic display devices 100 to 300, a second hand 1021, a minute hand 1022, and an hour hand 1023. The side surface of the watch case 1002 is provided with a crown 1010 serving as an operation bar and an operation button 1011. The crown 1010 is connected to a winding stem (not shown) disposed inside the watch case, and is freely pushed, pulled, rotated with a plurality of steps (for example two steps) along with the winding stem. The display portion 1005 can display a background image and a character string, such as data and time, or can display a second hand, a minute hand, and a hour hand.

Figure 19:
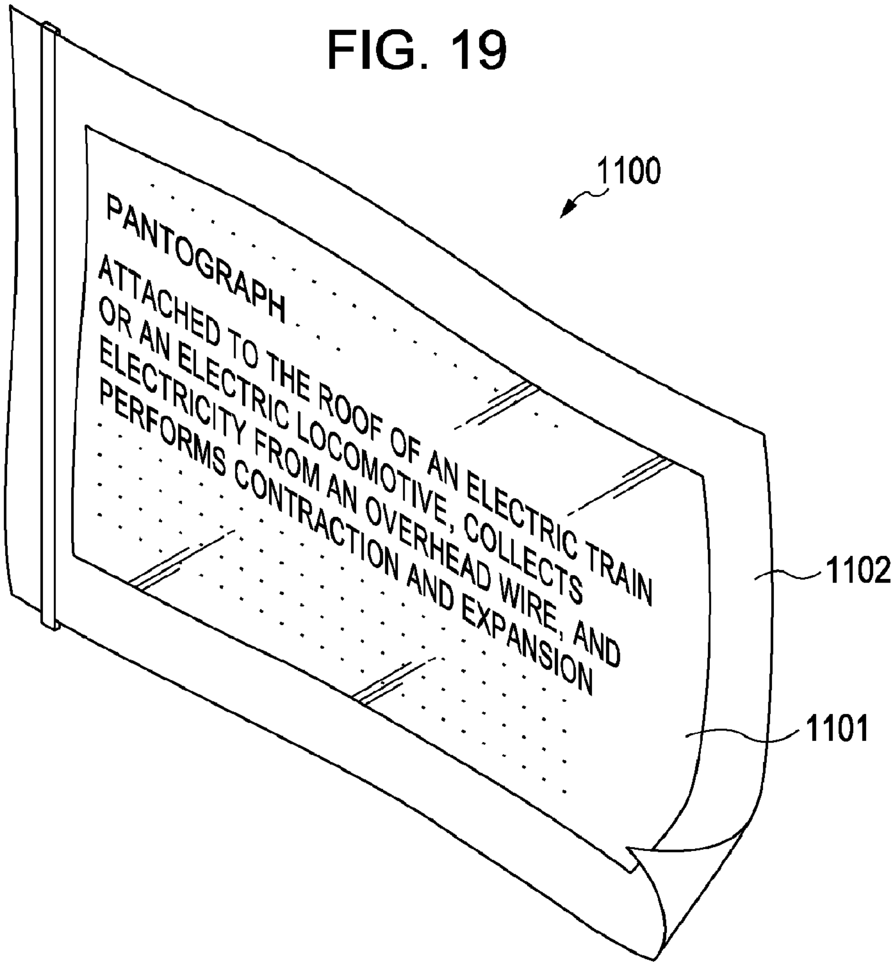
FIG. 19 is a view illustrating electronic paper which is another example of an electronic apparatus.

FIG. 19 shows a structure of electronic paper 1100. The electronic paper 1100 has any one of the electrophoretic display devices 100 to 300 at a display region 1101. The electronic paper 1100 is flexible, and includes a sheet-like body 1102 having paper-like texture and flexibility.

Figure 20:
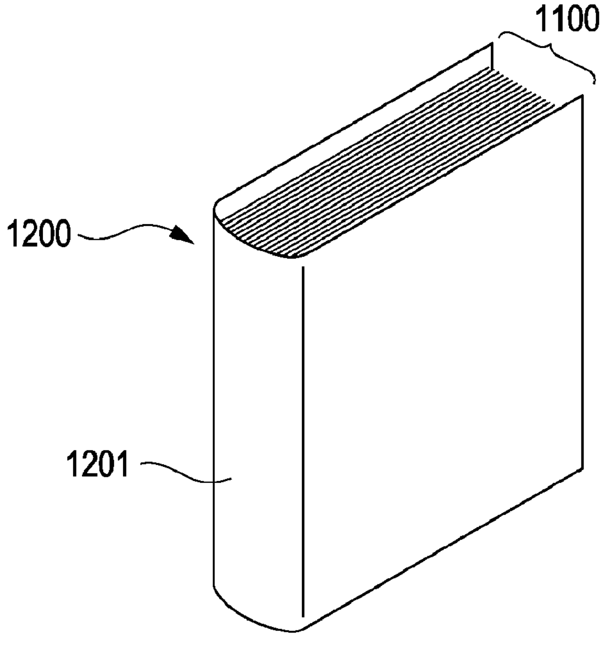
FIG. 20 is a view illustrating an electronic notebook which is a further example of an electronic apparatus.

FIG. 20 shows a structure of an electronic notebook 1200. The electronic notebook 1200 includes a plural number of the electronic paper 1100 having the above-mentioned structure which is interposed between covers 1201. The cover 1201 may be provided with a display data input unit (not shown) by which it is possible to input display data sent from an external device. With this structure, it is possible to change and update the display content in a state in which the electronic paper is filed according to the display data.

According to the write watch 1000, the electronic paper 1100, and the electronic notebook 1200, since any of the electrophoretic display devices 100 to 300 according to this embodiments of the invention is applied to them, they become electronic apparatuses, each having a high quality display portion which does not cause color fade-out after an image display. The above electronic apparatuses are only exemplary electronic apparatuses to which the electrophoretic display device according to the invention is applied. So the above electronic apparatuses do not limit the technical scope of the invention. For example, the electrophoretic display device according to the invention also can be applied to other electronic apparatuses such as a cellular phone and a portable audio machine as a display portion.

The entire disclosure of Japanese Patent Application No. 2008-066226, filed Mar. 14, 2008 is expressly incorporated by reference herein.

What is claimed is:

1. A driving method of an electrophoretic display device, the electrophoretic display device including:

a pair of substrates;

an electrophoretic element which contains electrophoretic particles, the electrophoretic element being interposed between the substrates;

a plurality of pixel electrodes located between the electrophoretic element and one substrate of the pair of substrates; and a common electrode which opposes to the plurality of pixel electrodes and is formed at an electrophoretic element side of the other substrate, and the driving method comprising:

during an image display period, displaying an image according to image data by inputting potentials, which are determined according to the image data to the plurality of pixel electrodes and inputting a predetermined potential to the common electrode; and during an image maintaining period after the image display period:

causing the plurality of pixel electrodes and the common electrode to have the same potential, and causing the plurality of pixel electrodes to fall to a high impedance state and inputting a convergence potential determined according to potential distribution of the pixel electrodes to the common electrode.

2. The driving method of an electrophoretic display device according to claim 1, wherein the image maintaining period is performed before a high and low relationship between potentials of the pixel electrodes and the common electrode in the high impedance state is reversed.

3. The driving method of an electrophoretic display device according to claim 1, further comprising acquiring the convergence potential on the basis of gradation distribution in the image data before the image maintaining period.

4. An electrophoretic display device comprising:

a pair of substrates;

an electrophoretic element which is interposed between the substrates and contains electrophoretic particles;

a plurality of pixel electrodes located between the electrophoretic element and one substrate of the pair of substrates;

a common electrode which opposes to the plurality of pixel electrodes and is formed at an electrophoretic element side of the other substrate; and a control portion which drives the plurality of pixel electrodes and the common electrode, wherein:

the control portion performs an image display period in which potentials determined according to image data are input to the plurality of pixel electrodes, a predetermined potential is input to the common electrode, and an image is displayed on the basis of the image data by driving the electrophoretic element, the control portion performs an image maintaining period which comes after the image display period and in which the plurality of pixel electrodes and the common electrode are at the same potential, and during the image maintaining period, after the image is displayed, the plurality of pixel electrodes comes to fall to the high impedance state and the common electrode is applied with a convergence potential determined according to potential distribution of the pixel electrodes.

5. The electrophoretic display device according to claim 4, further comprising a convergence potential computing portion which computes the convergence potential on the basis of the image data.

6. The electrophoretic display device according to claim 5, wherein the convergence potential computing portion has a look-up table in which gradation distribution of the image data and the convergence potentials correspond to each other.

7. An electronic apparatus comprising the electrophoretic display device according to claim 4.

8. A driving method of an electrophoretic display device, the electrophoretic display device including:

a pair of substrates;

an electrophoretic element which contains electrophoretic particles, the electrophoretic element being interposed between the substrates;

a plurality of pixel electrodes located between the electrophoretic element and one substrate of the pair of substrates; and a common electrode which opposes to the plurality of pixel electrodes and is formed at an electrophoretic element side of the other substrate, and the driving method comprising:

during an image display period, displaying an image according to image data by inputting potentials, which are determined according to the image data to the plurality of pixel electrodes and inputting a predetermined potential to the common electrode; and during an image maintaining period after the image display period, causing the plurality of pixel electrodes and the common electrode to have the same potential, wherein during the image display period, the plurality of pixel electrodes is applied with a positive potential or a negative potential and the common electrode is applied with a midway potential between the positive potential and the negative potential, and during the image maintaining period, the plurality of pixel electrodes and the common electrode are applied with the midway potential.

9. A driving method of an electrophoretic display device, the electrophoretic display device including:

a pair of substrates;

an electrophoretic element which contains electrophoretic particles, the electrophoretic element being interposed between the substrates;

a plurality of pixel electrodes located between the electrophoretic element and one substrate of the pair of substrates; and a common electrode which opposes to the plurality of pixel electrodes and is formed at an electrophoretic element side of the other substrate, and the driving method comprising:

during an image display period, displaying an image according to image data by inputting potentials, which are determined according to the image data to the plurality of pixel electrodes and inputting a predetermined potential to the common electrode; and during an image maintaining period after the image display period, causing the plurality of pixel electrodes and the common electrode to have the same potential, wherein during the image display period, the pixel electrodes are applied with a first potential and a second potential which are a positive potential or a ground potential, and the common electrode is applied with a signal in which the first potential and the second potential periodically alternate with each other, and during the image maintaining period, the plurality of pixel electrodes and the common electrode are applied with a potential between the first potential and the second potential.

* * * * *